United States Patent

Abe et al.

[11] Patent Number: 5,828,641
[45] Date of Patent: Oct. 27, 1998

[54] DISC PLAYER

[75] Inventors: Hiroshi Abe; Hideki Sakamoto, both of Iwaki, Japan

[73] Assignee: Alpine Electronics, Inc., Tokyo, Japan

[21] Appl. No.: 604,232

[22] Filed: Feb. 21, 1996

[30] Foreign Application Priority Data

Mar. 3, 1995 [JP] Japan .................................. 7-070799

[51] Int. Cl.⁶ .................................................. G11B 33/02
[52] U.S. Cl. .......................................................... 369/77.1
[58] Field of Search .................................. 369/77.1–77.2, 369/75.1–75.2; 360/99.02, 99.06

[56] References Cited

U.S. PATENT DOCUMENTS

| | | | |
|---|---|---|---|
| 4,641,298 | 2/1987 | Ikedo et al. | 369/77.1 |
| 4,995,027 | 2/1991 | Aoyagi et al. | 369/77.1 |
| 5,119,354 | 6/1992 | Umesaki | 369/77.1 |
| 5,136,570 | 8/1992 | Takai et al. | 369/77.1 |
| 5,416,763 | 5/1995 | Ohsaki | 369/77.1 |
| 5,544,148 | 8/1996 | Nakamichi | 369/77.1 |

*Primary Examiner*—Allen T. Cao
*Attorney, Agent, or Firm*—Brinks Hofer Gilson & Lione

[57] ABSTRACT

A disc player capable of immediately ejecting an inserted disc of a type having a diameter other than a predetermined diameter. If a disc having a predetermined diameter is inserted, a pair of detection pins are moved away from each other so that both of first and second switches are switched off. If the disc is further inserted, one of the detection pins causes a detection lever is moved such that a third switch is switched off. At this time, a motor is started so that a roller is rotated and the disc is drawn into the disc player. If a small disc has been inserted, all of the first, second and third switches are not switched off. When the first switch or the second switch has been switched off, a timer starts. If a discrimination is performed that the inserted disc is not a disc of a type having the predetermined diameter, then the roller is rotated in the ejection direction so that an ejecting operation is immediately performed.

16 Claims, 11 Drawing Sheets

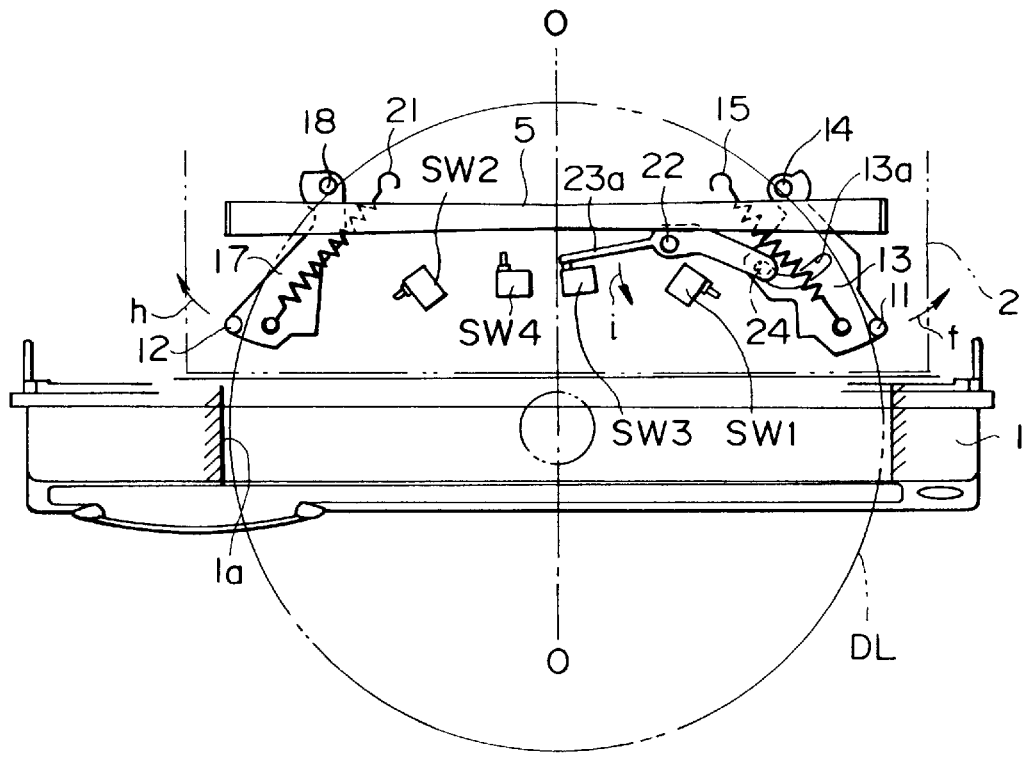
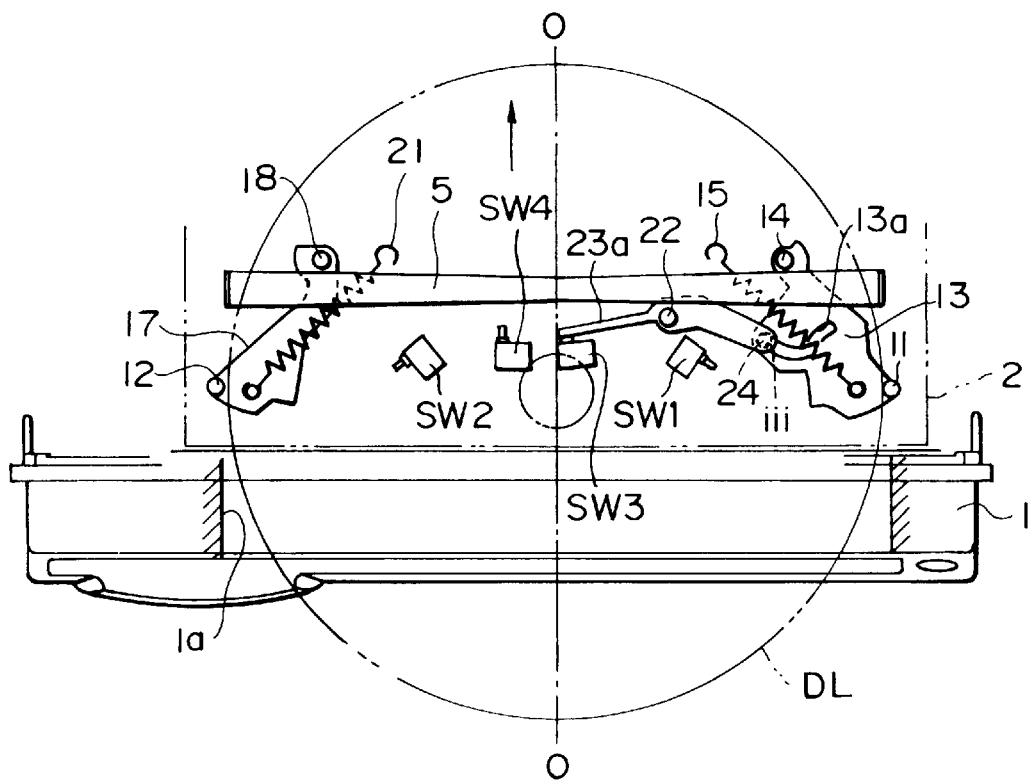

DISC PLAYER

BACKGROUND OF THE INVENTION

1. Field of the Invention

The present invention relates to a disc player into which, for example, a 12-cm disc is loaded, and more particularly to a disc player capable of rapidly inhibiting insertion of a disc having a diameter other than a predetermined diameter, and realizing a detection means for discriminating the diameter of an inserted disc while requiring only a simple structure.

2. Related Background Art

A disc player, for example, a CD (Compact Disc) player or a CD-ROM player, to be mounted on an automobile, is so designed as to accommodate a disc having a diameter of 12 cm which is inserted through a disc insertion opening thereof. A disc player of the foregoing type must be provided with a structure for inhibiting insertion of a disc of a type having a diameter, for example, 8 cm, through the disc insertion opening thereof.

A conventional CD player, to be mounted on an automobile, has a structure such that if a disc having a predetermined diameter or a small disc having a diameter of, for example, 8 cm, is inserted through the disc insertion opening thereof, then the insertion is detected by, for example, optical detection devices. Then, a conveyance means, having rollers or the like and disposed in the disc insertion opening, starts conveying so that any disc is temporarily introduced into the body of the CD player regardless of the diameter of the disc. In the body of the CD player, there is disposed an identification and detection means formed by a plurality of optical detection devices. By combining detection outputs from the plural detection devices with one another, whether or not the disc, inserted into the body of the CD player, has the predetermined diameter is discriminated.

If a discrimination has been, in accordance with outputs denoting the detections, performed that the inserted disc does not the predetermined diameter, the conveyance means rotates reversely so that the inserted disc, for example, a small disc, is returned to the disc insertion opening. If a discrimination has been performed that the inserted disc has the predetermined diameter, the inserted disc is clamped above a turn table of a disc drive mechanism so that reading of signals recorded on the disc and/or recording of signals on the disc is enabled.

However, the conventional disc player, having the structure such that any disc is temporarily introduced into the body thereof by the conveyance means and a disc of the type having a diameter other than a predetermined diameter, for example, a small diameter, and inserted erroneously is ejected, takes an excessively long time to eject the erroneously inserted disc. If a disc having, for example, a small diameter is erroneously inserted, the disc is temporarily introduced into the body of the disc player and then it is ejected by the conveyance means. Therefore, when a disc having, for example, a small diameter, and introduced into a deviated position in the body of the disc player is ejected, the disc can be caught in the body of the disc player. Thus, there is a problem that normal ejection becomes impossible to perform. The foregoing phenomenon causes a breakdown of the player.

The conventional disc player into which a disc, having, for example, a small diameter, is temporarily introduced into the body thereof and is then ejected, has a structure such that the diameter of the disc is discriminated by the plural optical detection means when the disc is introduced into the body thereof or the diameter of the disc is discriminated during introduction of the disc into the body of the disc player.

The disc player, having the foregoing structure such that the diameter of the disc is identified after the disc has been temporarily introduced into the body thereof, must have a plurality of optical detection devices and switching devices over a wide range in the body thereof. Therefore, the configuration of the detection devices for identifying the diameter of the disc becomes too complicated. Moreover, the configuration of the detection devices limits the configuration of other mechanisms in the body of the disc player.

Moreover, a disc player of the foregoing type must have a variety of detection means, such as means for detecting insertion of a disc, that for detecting completion of disc ejection, and that for detecting re-insertion of the ejected disc, in addition to the detection means for discriminating the diameter of the disc. Since the foregoing detection means are disposed near the disc insertion opening, they cannot easily be formed into means common to the detection means for discriminating the diameter of the disc, which is disposed in the body of the disc player. As a result, a variety of detection means having individual functions must be disposed in the body of the disc player and therefore the structure of the player becomes too complicated.

SUMMARY OF THE INVENTION

To overcome the foregoing problems experienced with the conventional structure, an object of the present invention is to provide a disc player capable of quickly performing an ejection process by immediately discriminating the diameter of the inserted disc when the disc has been inserted into the disc insertion opening thereof and by immediately ejecting a disk having a diameter other than a predetermined diameter.

Another object of the present invention is to shorten the time required to discriminate the diameter of an inserted disc by immediately measuring the time when a disc having a predetermined diameter or that having a diameter other than the predetermined diameter is inserted and by enabling the disc having the diameter other than the predetermined diameter to be ejected immediately.

Another object of the present invention is to simplify the structure of the detection means by causing a detection means disposed near a disc insertion opening to be used commonly as a means for detecting insertion of a disc, a means for detecting ejection of the same, a means for detecting reinsertion and a means for discriminating the diameter of the inserted disc.

Another object of the present invention is to enable a variety of detecting operations to be performed accurately while requiring only a simple structure by combining a mechanical structure and detection devices.

To achieve the foregoing objects, according to one aspect of the present invention, there is provided a disc player having a disc insertion opening, through which a disc is inserted, and conveyance means for introducing the disc inserted through the disc insertion opening into the body of the disc player and ejecting the disc from the body of the disc player through the disc insertion opening, the disc player comprising: detection means for discriminating the diameter of an inserted disc; and a control portion which operates the conveyance means to introduce the disc into the body of the disc player if a discrimination has been performed by the detection means that the inserted disc is a disc having a predetermined diameter, and which does not operate the conveyance means in an introduction direction but operates the conveyance means in only an ejection direction if a discrimination has been performed that a disc having a diameter other than the predetermined diameter has been inserted.

The foregoing disc player may be structured in such a manner that a timer is started when the detection means has detected insertion of a disc, and if a detection has not been performed within a predetermined time from start of the timer that a disc having the predetermined diameter has been inserted, then the conveyance means starts operating in the ejection direction.

The foregoing disc player may be structured in such a manner that the timer is started when the conveyance means starts operating in the ejection direction, if a detection has been performed by the detection means that ejection of the disc has been completed within a predetermined time from the start of the timer, then the conveyance means is stopped, if completion of the ejection within a predetermined time from the start of the timer has not been detected, then the conveyance means is stopped, and if the completion of the ejection has not been detected, then an ejection error is recognized by the control portion.

If the ejection error has been recognized by the control portion, occurrence of the ejection error is displayed on a display portion or the like to enable a user to cause the disc player to restart the ejection process by depressing an ejection button.

The detection means according to the present invention may include a pair of detection pins arranged to be moved away from each other by the outer surface of the inserted disc and detection devices arranged to respectively detect movements of the detection pins. If movements of the pair of detection pins away from each other for a distance longer than a predetermined distance have been detected by the detection devices, then a discrimination is performed that a disc having the predetermined diameter has been inserted, and if movements of the detection pins away from each other for a distance longer than the predetermined distance have not been detected by the detection devices, then a discrimination is performed that a disc having a diameter other than the predetermined diameter has been inserted.

As an alternative to this, the detection means may include a pair of detection pins arranged to be moved away from each other by the outer surface of the inserted disc, first and second detection devices arranged to respectively detect movements of the detection pins away from each other, and a third detection device for detecting as to whether either of the detection pins has been moved for a distance longer than a predetermined distance. If the movements of the detection pins have been detected by the first and second detection devices and the movement of either of the detection pins for the distance longer than the predetermined distance has been detected by the third detection device, then a discrimination is performed that a disc having the predetermined diameter has been inserted, and a discrimination is performed that a disc having a diameter other than the predetermined diameter has been inserted in other cases.

The foregoing structure may be arranged in such a manner that when movement of either of the detection pins has been detected by the detection device, the timer is started, and if movements of the detection pins away from each other for a distance longer than a predetermined distance have not been detected within a predetermined time from the start of the timer, then the conveyance means is started in the ejection direction.

As an alternative to this, a structure may be employed in which if either of the first and second detection devices has detected movement of the detection pin, then the timer is started. If the residual detection device has not detected movement of the detection pin within a predetermined time from the start of the timer, then the conveyance means starts operating in the ejection direction. If the residual detection device has detected movement of the detection pin within the predetermined time from the start of the timer, then the operation of the timer is temporarily stopped and then the timer is restarted. Finally, if the third detection device has not detected the movement of the detection pin for a distance longer than the predetermined distance within a predetermined time from the restart of the timer, then the conveyance means starts operating in the ejection direction.

The foregoing disc player may be structured in such a manner that if the third detection device has detected restoration of either of the detection pins to a predetermined position at a moment at which the first and second detection devices have not detected restorations of the detection pins when the disc loaded into the body of the disc player and having the predetermined diameter is ejected by the conveyance means, then the conveyance means is stopped and the disc is stopped.

The foregoing disc player may be structured in such a manner that when the disc has been again pushed and movement of the detection member has been detected by the third detection device, the conveyance means starts in the introduction direction so that the disc is again introduced into the body of the disc player.

According to the foregoing means, if a disc having a predetermined diameter (a designed diameter) or a disc having a diameter other than the predetermined diameter is inserted through the disc insertion opening, the detection means immediately discriminates the disc. If a detection is performed that a disc having a predetermined diameter is inserted, the conveyance means having a roller and the like introduces the disc having the predetermined diameter into the body of the disc player so as to be clamped by a disc drive mechanism so that reproduction or recording operations are enabled. If the foregoing detection means discriminates that the inserted disc is a disc having a diameter other than the predetermined diameter, the conveyance means does not perform the introducing operation but immediately performs an ejecting operation. Therefore, even if a disc having a diameter other than a predetermined diameter, for example, a small diameter, is pushed inwards to a position at which the disc is held by the conveyance means, the inserted disc is immediately ejected through the disc insertion opening. Thus, a disc having a diameter other than a predetermined diameter can be quickly ejected. Moreover, a problem can be prevented because a small disc or the like is not caught in the body of the disc player. Since discrimination of the diameter of the disc is performed at a position near the disc insertion opening, detection devices for identifying the diameter of the disc are concentrically disposed near the disc insertion opening. Thus, the structure in the body of the disc player is not limited by the configuration of the detection devices.

The structure is arranged in such a manner that the timer is started when the detection means has detected insertion of a disc having a predetermined diameter or a disc having another diameter. If insertion of a disc having the predetermined diameter is not detected within a predetermined time from the start of the timer, the conveyance means ejects the disc having a diameter other than the predetermined diameter. Thus, a disc having a diameter other than the predetermined diameter can be ejected within a predetermined time. As a result, the ejection process can be completed quickly.

If the structure is arranged in such a manner that the timer is also started when the conveyance means has started operating in the ejection direction to detect whether or not the ejection has been completed within a predetermined time, the time required for the conveyance means to complete the conveyance operation can be shortened. Moreover, the ejection error state can be detected immediately.

When the detection means consists of the detection pins and the detection devices, such as the switches, for detecting whether or not the detection pins are moved away from each other for a predetermined distance, detection of the diameter of the disc, detection of insertion and timer start operation can be performed with a simple mechanical structure and all by the mechanism disposed near the disc insertion opening.

If the third detection device for detecting whether or not either detection pin of a pair of the detection pins has been moved for a predetermined distance is provided in addition to the first and second detection devices for detecting whether or not the pair of the detection pins have been moved, confirmation of the operation of each of the first, second and third detection devices enables a detection whether or not a disc having a predetermined diameter has been inserted to be performed with additional accuracy.

The structure having the pair of detection pins may be arranged in such a manner that the timer is started when movement of either detection pin is detected by the detection device and, if movement of the detection pins away from each other for a predetermined distance is not detected within a predetermined time from the start of the timer, then the disc having a diameter other than the predetermined diameter is ejected. If a disc having a predetermined diameter is inserted, either of the detection pins always starts operating. Therefore, the timer can be started immediately after the insertion of a disc through the disc insertion opening. Thus, a process for ejecting a disc having a diameter other than the predetermined diameter can be completed in a short time.

If the structure is employed in which the third detection device is able to detect whether or not either detection pin has been moved for a predetermined distance, the operation of the conveyance means for ejecting a disc can be stopped in accordance with the detection output of the third detection device. Thus, completion of ejection of a disc having a predetermined diameter can be detected reliably by the operation of either of the detection pins.

Re-insertion of the disc in the state where ejection of the disc has been completed can be detected by the third detection device. Thus, the conveyance means is immediately started to enable the disc having the predetermined diameter to be re-introduced (reloaded). That is, the detection device consisting of the pair of detection pins and the switch enable all of detection operations and setting processes of control operations, such as detection of insertion, starting of the timer, identification of the diameter of the disc, completion of the ejection of the disc and detection of re-insertion of the disc to be performed.

Other objects, features and advantages of the invention will be evident from the following detailed description of the preferred embodiments described in conjunction with the attached drawings.

BRIEF DESCRIPTION OF THE DRAWINGS

FIG. 6 is a partial plan view showing a state during operation of the conveyance means to introduce the disc having the predetermined diameter;

FIG. 7 is a partial plan view showing a state where a maximum-diameter portion of the disc having the predetermined diameter is passing between the detection pins;

DESCRIPTION OF THE PREFERRED EMBODIMENT

A preferred embodiment of the present invention will now be described.

Figure 1:
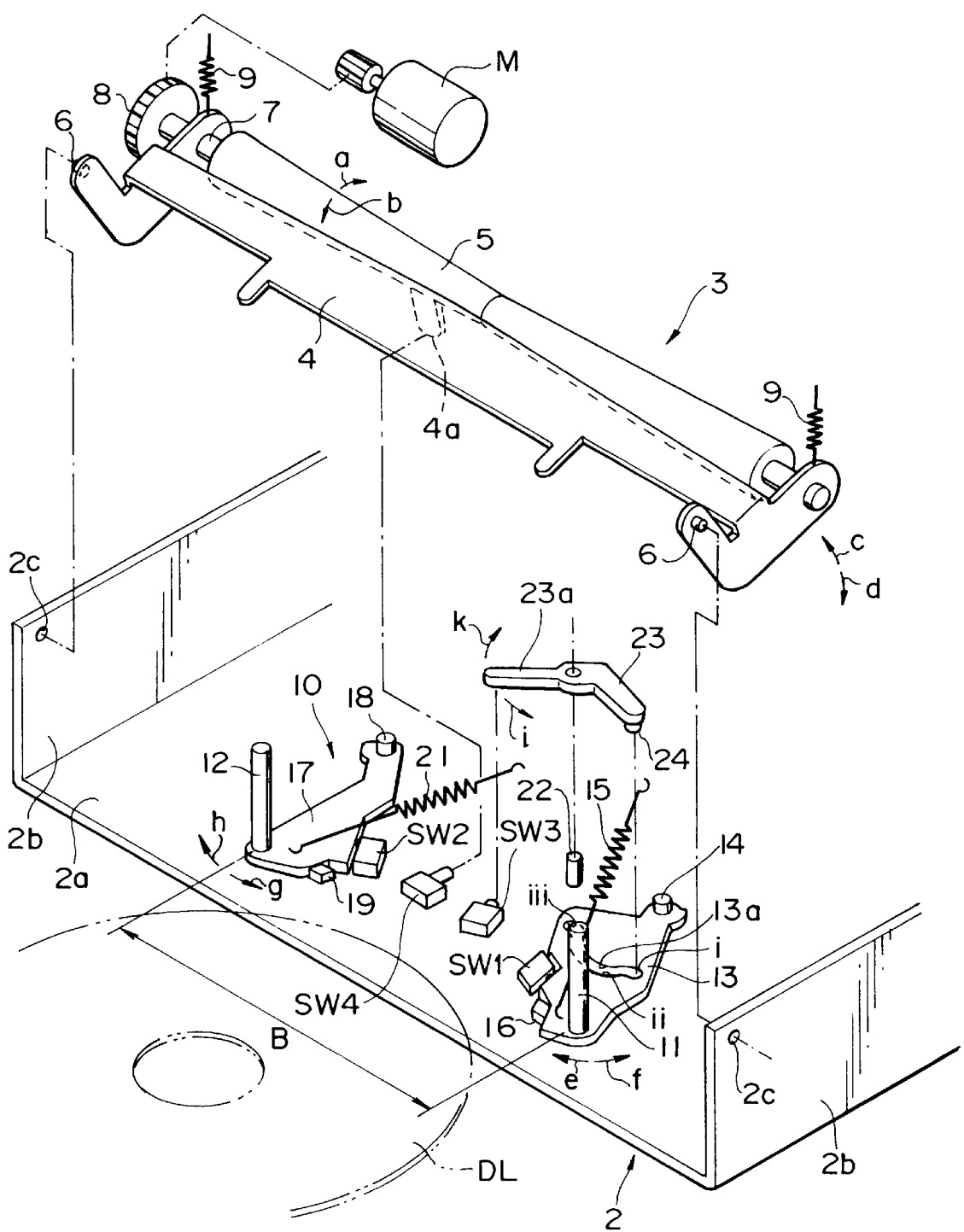
FIG. 1 is an exploded perspective view of a portion of a CD player, to be mounted on an automobile, and serving as an example of a disc player according to the present invention.
Figure 2:
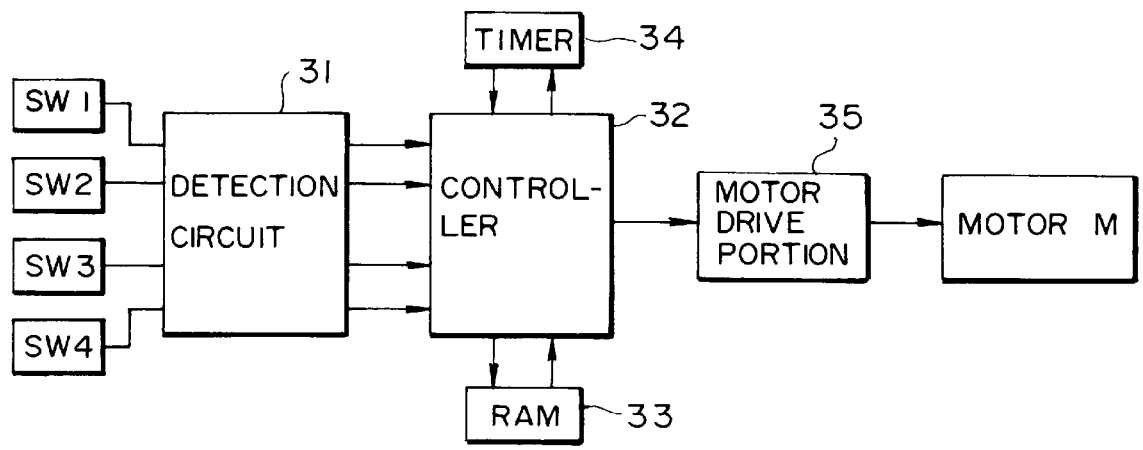
FIG. 2 is a circuit diagram showing the schematic structure of an electric circuit of the disc player according to the present invention.

FIG. 1 is an exploded perspective view of a portion of a CD player, to be mounted on an automobile, and serving as an example of a disc player according to the present invention. FIG. 2 is a circuit diagram showing a schematic structure of an electric circuit portion of the CD player. FIGS. 3 to 13 are partial plan views showing identifying, introducing and ejecting operations of a disc. FIGS. 14 to 17 are flow charts of a control operation.

Figure 3:
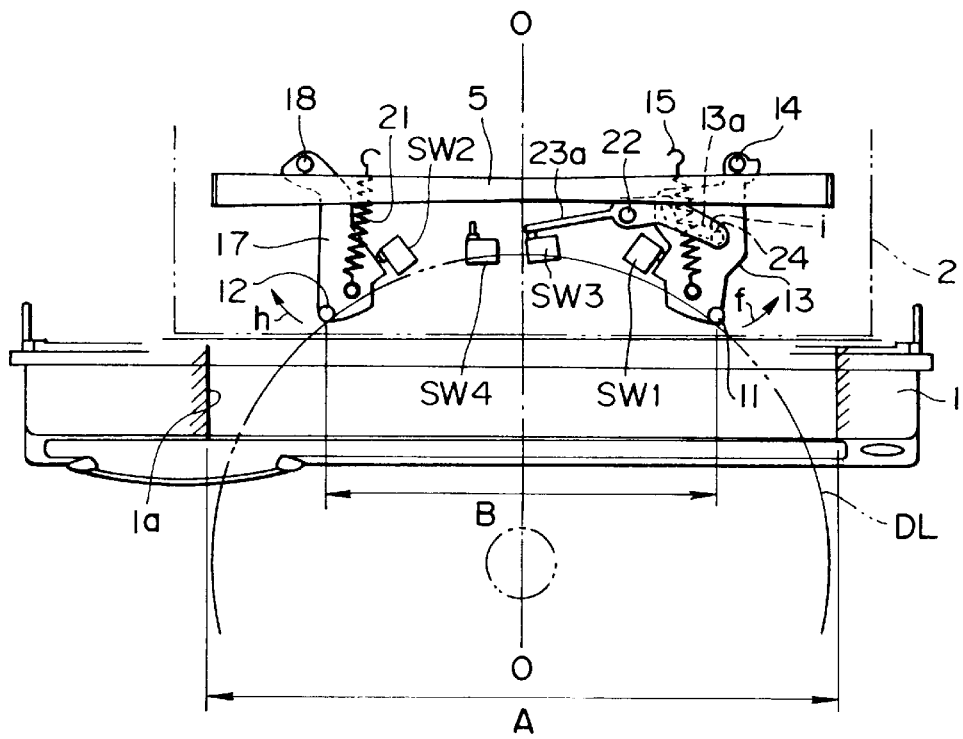
FIG. 3 is a partial plan view showing a state where insertion of a disc having a predetermined diameter starts.

Referring to FIG. 3 which is the partial plan view, reference numeral 1 represents a nose portion of the CD player to be mounted on an automobile. A frame of the CD player is embedded in a console panel of a compartment of the automobile. The nose portion 1 is disposed on the surface of the console panel. The nose portion 1 has a variety of operation buttons and a display portion, such as a liquid crystal panel, on the surface thereof. The nose portion 1 has a disc insertion opening 1a. Dimension A of the disc insertion opening 1a is slightly larger than the diameter of a disc (compact disc) DL having a predetermined diameter of, for example, 12 cm.

The disc player permits only the disc DL having the predetermined diameter (the diameter of 12 cm) to be loaded and inhibits loading of other discs, for example, a disc DS having a diameter of, for example, 8 cm.

A frame disposed behind the nose portion 1 includes a mechanism chassis 2. As shown in FIG. 1, the mechanism chassis 2 has a structure formed by bending side plates 2b at the right and left ends of a bottom plate 2a. The mechanism chassis 2 has a roller bracket 4 and a roller 5 forming a conveyance means 3. The roller bracket 4 is manufactured by sheet metal working and is provided with support shafts 6 on the two sides thereof, the support shafts 6 being rotatively supported by support holes 2c formed in two side plates 2b of the mechanism chassis 2.

The two ends of the roller shaft 7, which supports the roller 5, are rotatively supported by the roller bracket 4. A gear 8 is secured to an end of the roller shaft 7 so that the rotational force of a motor M disposed at a predetermined position of the mechanism chassis 2 is, through a reduction gear train (not shown), transmitted to the foregoing gear 8. Thus, the rotational force of the motor M drives the roller 5 in an introduction direction a or an ejection direction b.

The roller bracket 4 is urged in a direction c by springs 9. The urging force presses the roller 5 against an opposing member, such as a roller or a shoe, disposed above the roller 5. A boundary portion, in which the roller 5 is pressed against the opposing member, is located inside the disc insertion opening 1a. Thus, the disc DL inserted through the disc insertion opening 1a is held between the roller 5 and the opposing member. When the roller 5 is driven into the direction a by the rotational force of the motor M, the disc DL is introduced into a position above a disc drive mechanism in the body of the disc player (a position inside the mechanism chassis 2). When the roller 5 is driven in the ejection direction b in a state where the disc DL is held between the roller 5 and the opposing member, the disc DL is ejected through the disc insertion opening 1a.

A mechanism (not shown), disposed in the mechanism chassis 2, drives the roller bracket 4 in a direction d. The foregoing mechanism is arranged to be operated in synchronization with a clamp drive unit of a disc drive mechanism disposed in the mechanism chassis 2. When the disc DL held between the roller 5, which is being moved in the direction c, and the opposite member, has been introduced into the body of the disc player and then located on a turn table of the disc drive mechanism, a clamper is moved downwards by the clamp drive unit so that the central portion of the disc DL is clamped to the turn table. Simultaneously with the foregoing clamping operation, the clamp drive unit drives the roller bracket 4 in a direction d so that the roller 5 is moved downwards. Thus, the roller 5 is separated from the lower surface of clamped disc DL.

A detection means 10 is disposed near the disc insertion opening 1a. The detection means 10 is provided with a pair of detection pins 11 and 12.

The detection pin 11 is formed integrally with a bracket 13 so as to be supported by a shaft 14 secured to the bottom plate 2a of the mechanism chassis 2, the detection pin 11 being made rotative in directions e–f. The bracket 13 is urged in a direction e by a spring 15 which is an urging member. Since the bracket 13 is therefore brought into contact with a stopper 16 secured to the bottom plate 2a, the quantity of rotation of the bracket 13 in the direction e is limited.

The other detection pin 12 is formed integrally with a bracket 17. The bracket 17 is rotatively supported by a shaft 18 secured to the bottom plate 2a, the bracket 17 being made rotative in directions g–h. The bracket 17 is urged in a direction g by a spring 21 which is an urging member. A stopper 19 secured to the bottom plate 2a limits the quantity of rotation of the bracket 17 in the direction g.

The springs 15 and 21 urge the detection pins 11 and 12 in directions e and h respectively so that the detection pins 11 and 12 are brought into contact with the stoppers 16 and 19. Distance B between the detection pin 11 and the detection pin 12 is, in this state, determined to be slightly shorter than the diameter of a disc having a small diameter of 8 cm.

A shaft 22 is secured to the bottom plate 2a of the mechanism chassis 2. A detection lever 23, serving as a third detection member, is rotatively supported by the shaft 22. A pin 24 is disposed at the base of the detection lever 23, the pin 24 being inserted into a cam groove 13a formed in the bracket 13 which supports the detection pin 11. The cam groove 13a has first and third guide portions i and iii, each of which is formed into a circular arc locus having a short radius from the shaft 14, and a second guide portion ii which is formed into a circular arc locus having a radius from the shaft 14 longer than the radius of each of the guide portions i and iii. When the pin 24 is located in the first guide portion i or the third guide portion iii, the detection lever 23 is rotated in a direction j. When the pin 24 is located in the second guide portion ii, the detection lever 23 is rotated in a direction k.

The bottom plate 2a is provided with depression-type switches serving as four detection devices. A first switch SW1 serving as a first detection device is disposed opposite to the bracket 13. When the detection pin 11 has been moved to the direction e and causes the bracket 13 to be brought into contact with the stopper 16, the first switch SW1 is switched on. A second switch SW2 serving as a second detection device is disposed opposite to the bracket 17. When the detection pin 12 has been moved in the direction g and causes the bracket 17 to be brought into contact with the stopper 19, the second switch SW2 is switched on.

A third switch SW3 serving as a third detection device is disposed opposite to a leading portion 23a of the detection lever 23. When the detection lever 23 has been moved in the direction j, the third switch SW3 is switched on.

The detection output of the first switch SW1 is immediately changed from ON to OFF when the detection pin 11 starts moving from the position shown in FIG. 1 in the direction f. Similarly, the detection output of the second switch SW2 is immediately changed from ON to OFF when the detection pin 12 starts moving from the position shown in FIG. 1 in the direction h.

Since the third switch SW3 is switched on/off by the detection lever 23 and the detection lever 23 is guided by the cam groove 13a, the third switch SW3 has two switch points for its detection output. That is, when the detection pin 11 is moved in the direction f causing the first switch SW1 to be switched off and then the detection pin 11 is moved in the direction f for a predetermined distance, the boundary portion between the first guide portion i and the second guide portion ii of the cam groove 13a switches the detection output of the third switch SW3 from ON to OFF. The foregoing point is a first switch point for the detection output. When the detection pin 11 is further moved in the direction f from the first switch point, the boundary portion between the second guide portion ii and the third guide portion iii of the cam groove 13a switches the detection output of the third switch SW3 from OFF to ON. The foregoing point is a second switch point for the detection output. As described above, the third switch SW3 serving as the third detection device is designed to, at two points, detect whether or not the detection pin 11 has been moved in the direction f. Thus, a structure may be employed in which the detection lever 23 is not provided, and movement of each of the detection pin 11 and the bracket 13 in the direction f for a predetermined distance is directly detected by a third detection device, such as switch or an optical detection device.

A detection claw 4a formed by bending on the roller bracket 4 opposes a fourth switch SW4 serving as a fourth detection device. In the conveyance means 3, the roller bracket 4 is rotated in the direction c and the disc is held between the roller 5 and the opposing member when the disc is conveyed. At this time, the detection claw 4a is separated from the fourth switch SW4, and the fourth switch SW4 is switched off. When the disc DL having a predetermined diameter is introduced into the body of the disc player by the roller 5; the central portion of the disc DL is located with respect to the turn table of the disc drive mechanism and the clamping operation is completed, the roller bracket 4 is rotated in the direction d so that the roller 5 is moved away from the disc DL. When the roller 5 has been moved, the detection claw 4a depresses the fourth switch SW4 so that the fourth switch SW4 is switched on. That is, the fourth switch SW4 detects completion of clamping of the disc DL, having the predetermined diameter, in the body of the disc player.

FIG. 2 schematically shows the structure of an electric circuit for controlling the disc player. Switching of contacts of each of the switches SW1 to SW4 is individually detected by a detection circuit 31. The result of the detection is transmitted to a control portion 32 mainly composed of a CPU of a microcomputer. A random access memory (RAM) 33 includes a program to be executed by the control portion 32. A timer 34 starts and clears time measurement when an access is made from the control portion 32. The motor M shown in FIG. 1 is driven by a motor drive portion 35. The motor drive portion 35 is controlled by the control portion 32.

Although the embodiment shown in FIG. 1 employs the depression-type switches as the detection devices, a structure may be employed in which each or a portion of the detection devices is formed by an optical detection device. Switching of each switch between ON and OFF may be set arbitrarily. For example, a structure may be employed in which when the detection lever 23 is rotated in the direction i, the third switch SW3 is switched off. Moreover, switching of each of the first and second switches SW1 and SW2 between ON and OFF may be made conversely to the structure according to the embodiment shown in FIG. 1.

The operation of each of the switches SW1 to SW4 will now be described. The first switch SW1 or the second switch SW2 detects insertion of a disc DL, having a predetermined diameter, or a disc, having a diameter other than the predetermined diameter, for example, a disc DS having a small diameter, through the disc insertion opening 1a. The first switch SW1 or the second switch SW2 detects complete ejection of the disc through the disc insertion opening 1a.

The first and second switches SW1 and SW2 have a function of detecting expansion of a space between the detection pins 11 and 12. Whether or not the detection pins 11 and 12 are moved apart from each other for a predetermined distance can be detected by a combination of the third switch SW3 with the first and second switches SW1 and SW2. That is, the first, second and third switches SW1, SW2 and SW3 identify the diameter of the inserted disc.

Switching of the detection output from the third switch SW3 sets the timing at which the ejection of the disc from the body of the disc player is completed. The third switch SW3 also has a function of detecting start or reloading when the ejected disc is again inserted.

The fourth switch SW4 detects completion of clamping of the disc DL, having a predetermined diameter, on a turn table of the disc drive mechanism after the roller bracket 4 has been rotated in the direction d.

The operations of the detection pins 11 and 12, the detection lever 23, and the switches SW1 to SW4 will now be described with respect to the disc DL having a predetermined diameter (designed diameter of 12 cm) and a small disc DS having a diameter of 8 cm, which is not the designed diameter.

FIGS. 3 to 8 show the operation to be performed from insertion of the disc DL having the predetermined diameter through the disc insertion opening 1a to loading of the same in the body of the disc player.

As shown in FIG. 3, distance B between the opposing detection pins 11 and 12 realized when they are in contact with the stoppers 16 and 19 is shorter than the diameter of the disc DL, which is 12 cm. Note that the pair of the detection pins 11 and 12 are disposed laterally symmetrically at the same distance with respect to center line O—O of the disc insertion opening 1a.

Figure 4:
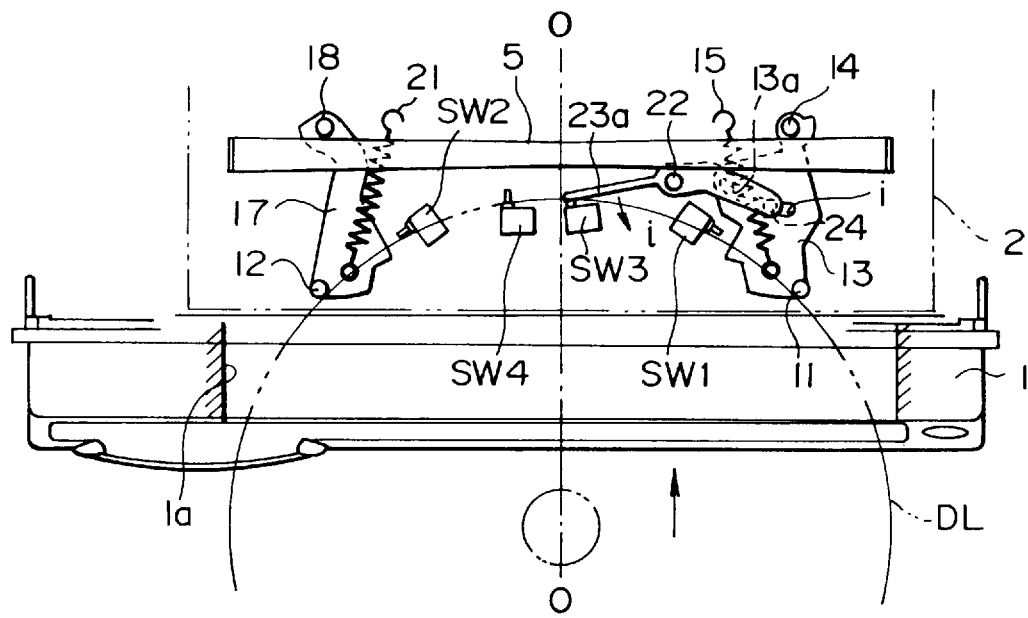
FIG. 4 is a partial plan view showing a state where the disc having the predetermined diameter is further pushed as compared with the state shown in FIG. 3.

When the disc DL is inserted through the disc insertion opening 1a, the detection pins 11 and 12 are depressed by the outer surface of the disc DL as shown in FIGS. 3 and 4. The detection pin 11 is pushed in the direction f and the detection pin 12 is pushed in the direction h to be moved away from each other, thus causing the distance between the detection pins 11 and 12 to be elongated. At the moment shown in FIG. 4, the bracket 13 has been separated from the first switch SW1 and the bracket 17 has been separated from the second switch SW2. Thus, both of the switches SW1 and SW2 are switched off. However, either of the switch SW1 or the second switch SW2 is previously switched off. If either of the switch SW1 or SW2 has been switched off, the insertion is detected and the timer 34 starts measuring the elapsed time of the control operation, to be described later.

At a moment shown in FIG. 4, the pin 24 of the detection lever 23 is located in the first guide portion i of the cam groove 13a formed in the bracket 13. Thus, the position of the detection lever 23 rotated in the direction i is maintained. Moreover, the third switch SW3 is switched on. When the disc DL is pushed inwards to a position shown in FIG. 5, the detection pins 11 and 12 are further moved away from each other in the directions f and h. When the detection pin 11 has been moved to the position shown in FIG. 5 for a predetermined distance, the pin 24 is inserted into the second guide portion ii of the groove cam 13a. Thus, the detection lever 23 is rotated in the direction k and the leading portion 23a of the detection lever 23 is separated from the third switch SW3. Thus, the third switch SW3 is switched off. That is, the third switch SW3 passes through the first switch point for the detection output, and therefore the third switch SW3, which has been switched on, is switched off.

When the third switch SW3 is switched off, the motor M starts rotating so that the roller 5 of the conveyance means 3 starts rotating in the direction a which is the insertion direction. However, the motor M starts rotating only when either of the first switch SW1 or the second switch SW2 is initially switched off at the moment shown in FIG. 3 in which the timer 34 starts time measurement; the residual one of the switches SW1 and SW2 is switched off within a predetermined time from the time measurement; and the third switch SW3 is switched off within a predetermined time from both of the switches SW1 and second switch SW2 being switched off. Both of the switches SW1 and SW2 are switched off and the detection pin 11 is moved for a distance longer than a predetermined distance to switch the third switch SW3 off only when the disc DL having a diameter of 12 cm has been inserted. If a disc having another diameter is inserted, the foregoing conditions are not satisfied.

Figure 5:
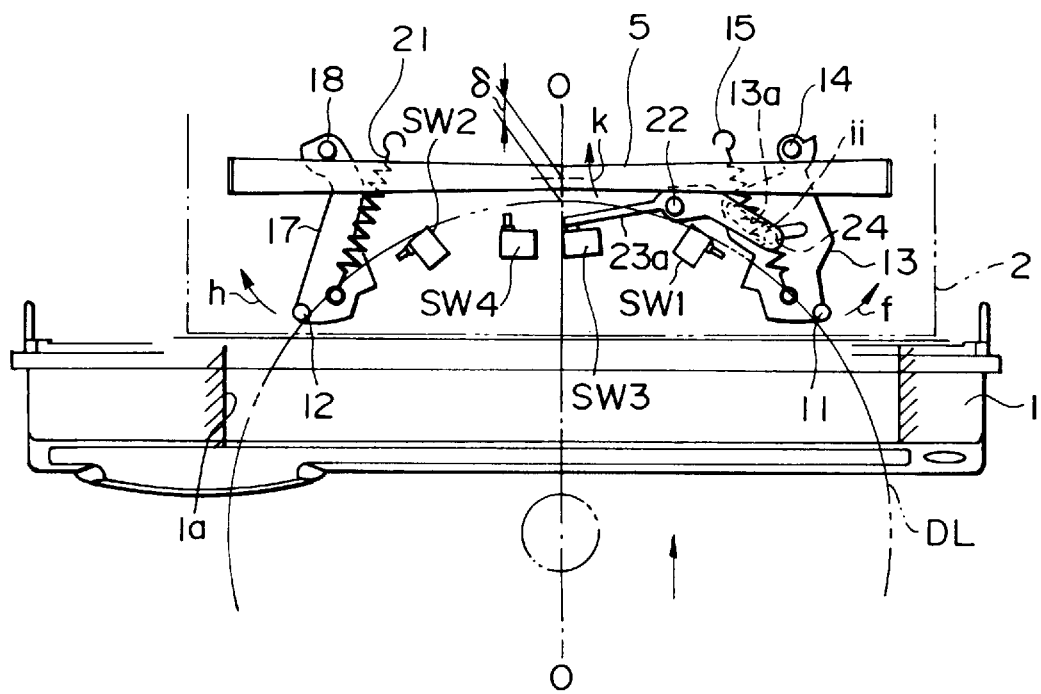
FIG. 5 is a partial plan view showing a moment when a motor starts rotating because insertion of a disc having the predetermined diameter has been discriminated.

The motor M starts rotating and the roller 5 starts rotating in the direction a at the moment shown in FIG. 5. At this time, distance δ remains from the leading end of the disc DL to the center of the roller 5. That is, the leading end of the disc DL does not reach the conveyance means 3. Thus, when the disc DL is further pushed inwards from the position shown in FIG. 5 and the leading end of the disc DL reaches the position of the roller 5, the roller 5 has started rotating. Therefore, the disc DL is smoothly introduced into the body of the disc player by the conveyance means 3. As a result, when the disc DL is inserted through the disc insertion opening 1a by hand, any resistance force preventing the insertion does not act so that the insertion operation touch is made satisfactory.

When the disc DL has been introduced into the body of the disc player by the roller 5, the distance from the detection pin 11 to the detection pin 12 is further elongated as shown in FIG. 6. Then, the detection pin 11 is moved considerably in the direction f, the pin 24 reaches the third guide portion iii of the cam groove 13a and the detection lever 23 is again moved in the direction i so that the third switch SW3 is again switched on. That is, when the disc DL has been introduced to the position shown in FIG. 6, the third switch SW3 reaches the second switch point for the detection output so that the third switch SW3, which has been switched off, is switched on. Then, the disc DL is introduced into the body of the disc player in the foregoing state. FIG. 7 shows a moment at which the portion of the disc DL having the maximum diameter passes between the detection pin 11 and the detection pin 12.

When the disc DL has been further introduced into the body of the disc player, the detection pin 11 is restored in the direction e due to the urging force of the spring 15, and the detection pin 12 is restored in the direction g due to the urging force of the spring 21. While the detection pin 11 is being restored in the direction e from the moment shown in FIG. 7, the pin 24 is moved from the third guide portion iii to the second guide portion ii of the cam groove 13a. Thus, the third switch SW3 is temporarily switched off. The pin 24 is further moved to the first guide portion i so that the third switch SW3 is finally switched on. When the rear end of the disc DL has been separated from the detection pins 11 and 12, the detection pins 11 and 12 are restored to the positions in which they are spaced apart from each other by the initial distance B. Thus, both of the switches SW1 and SW2 are again switched on.

If locating of the disc DL, having the diameter of 12 cm, on the disc drive mechanism in the body of the disc player has been detected by another detection member, the clamp drive unit starts operating so that the clamper is moved downwards. Thus, the central portion of the disc DL is clamped above the turn table. At this time, the roller bracket 4 is moved downwards in the direction d so that the roller 5 is moved downwards to a position apart from the disc DL. Completion of the downward movement is detected when the detection claw 4a switches the fourth switch SW4 on. At this time, loading of the disc DL having the predetermined diameter is completed.

In the ejection process in which the loaded disc DL having the diameter of 12 cm is ejected, clamping of the disc DL is suspended initially. Simultaneously with the suspension of clamping, the roller bracket 4 is moved upwards in the direction c so that the disc DL is held between the roller 5 and the opposing member. At this time, the motor M has started rotating and the roller 5 has been rotated in the direction b, which is the ejection direction, at the moment at which the roller 5 comes in contact with the disc DL.

Figure 8:
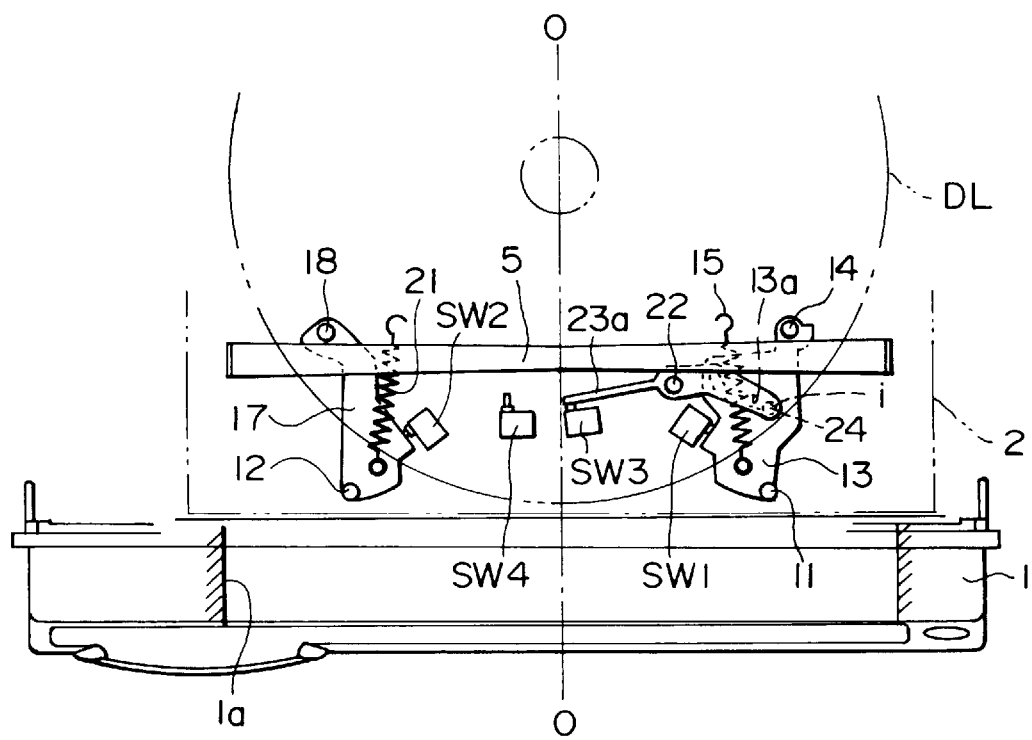
FIG. 8 is a partial plan view showing a state where introduction of the disc having the predetermined diameter has substantially been completed.

The disc DL is conveyed in a direction toward the disc insertion opening 1a due to the reverse rotation of the roller 5. The completion of the disc ejecting operation is detected at the second switch point for the detection output of the third switch SW3. That is, when ejection of the disc DL toward the disc insertion opening 1a starts, the distance from the detection pin 11 to the detection pin 12 has been restored to the distance B as shown in FIG. 8. Therefore, the outer surface of the moving disc DL adjacent to the disc insertion opening 1a pushes the detection pins 11 and 12 away from each other. Immediately after the detection pins 11 and 12 have been pushed away from each other, the pin 24 is shifted from the first guide portion i to the second guide portion ii of the groove cam 13a. Thus, the detection lever 23 is temporarily rotated in the direction k so that the third switch SW3 is switched off. When the disc DL is further conveyed and the detection pins 11 and 12 are further pushed away from each other, the pin 24 is introduced into the third guide portion iii of the groove cam 13a so that the third switch SW3 is again switched on. The foregoing moment is the moment at which the disc ejection is completed, and the motor M stops rotating.

In the foregoing ejecting operation, the disc DL is moved from the position shown in FIG. 8 toward the disc insertion opening 1a. When the disc DL substantially reaches the position shown in FIG. 7, the motor M stops rotating. In the foregoing state of stoppage, a portion of the disc DL is held between the roller 5 and the opposing member by the conveyance means 3; and only the leading end of the disc DL projects over the disc insertion opening 1a. When the user intends to eject the disc DL, the disc DL is held by the portion projecting over the disc insertion opening 1a so that the disc DL is ejected.

When the ejecting operation has been completed and the disc DL is again pushed inwards by hand in the state where the disc DL is stopped at about the position shown in FIG. 7, the detection pin 11 is moved in the direction e, causing the detection lever 23 to be moved in the direction k. Thus, the third switch SW3 is switched off. At this moment, the motor M starts rotating so that the roller 5 starts rotating in the direction a. Thus, the disc DL is again introduced into the body of the disc player.

In the case where the detection lever 23 and the third switch SW3 serving as the third detection device are provided, the third switch SW3 has the first switch point for the detection output at which the third switch SW3, which has been switched on, is switched off, and a second switch point for the detection output at which the third switch SW3, which has been switched off, is switched on. The first switch point for the detection output and switching of the first and second switches SW1 and SW2 off enable the diameter of the disc to be detected. Moreover, the second switch point for the detection output enables re-insertion (reloading) of the ejected disc to be detected.

FIGS. 9 to 13 show a state where a small disc DS having a diameter of 8 cm has been inserted through the disc insertion opening 1a.

Figure 9:
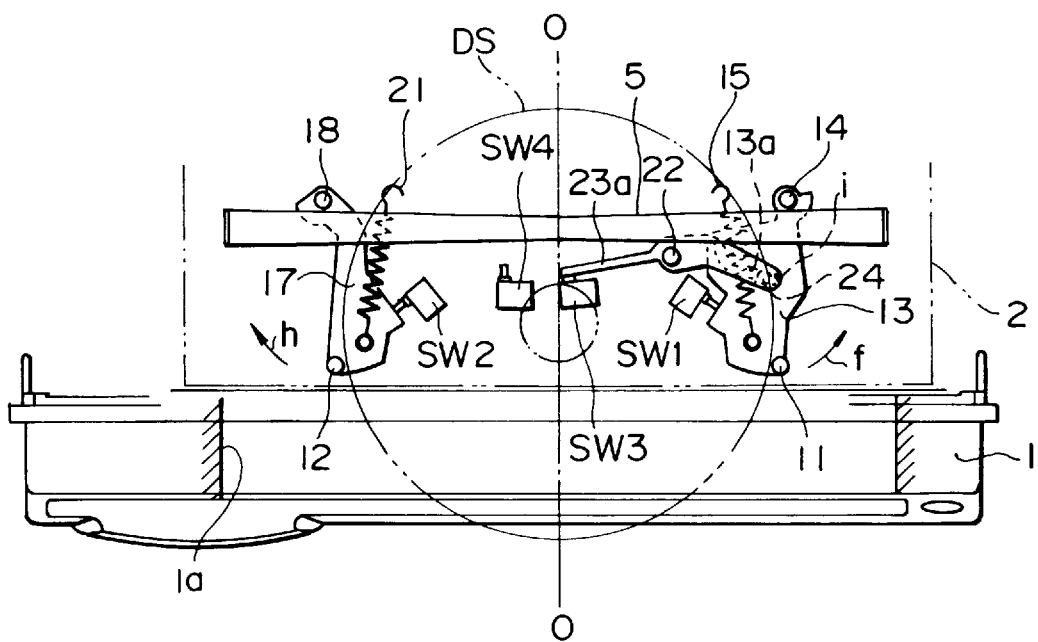
FIG. 9 is a partial plan view showing a state where a disc having a small diameter has been inserted along the center line of the disc insertion opening.

FIG. 9 shows a state where the small diameter disc DS has been inserted along center line O—O of the disc insertion opening 1a. At this time, the outer surface of the disc DS simultaneously pushes the detection pins 11 and 12 apart from each other in the directions f and h so that both of the first and second switches SW1 and SW2 are switched off. When the portions of the disc DS having the maximum diameter are brought into contact with the detection pins 11 and 12, the detection pins 11 and 12 are moved to positions farthest from the center line O—O. However, the detection pin 11 is not moved considerably in the direction f at this time and thus the position of the pin 24 is maintained in the first guide portion i of the cam groove 13a. Thus, the detection lever 23 is not moved in the direction k and the third switch SW3, which has been switched on, is maintained.

Figure 10:
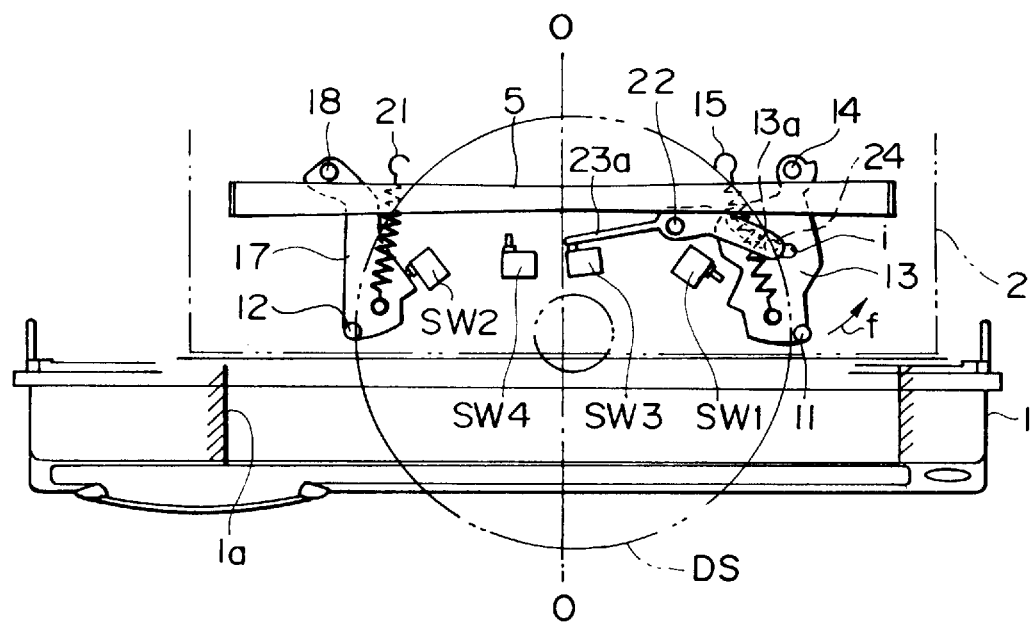
FIG. 10 is a partial plan view showing a state where the disc having the small diameter has been inserted from a position substantially deviated to the right.

FIG. 10 shows a state where the small diameter disc DS has been inserted from a position deviated to the right with respect to the center line O—O of the disc insertion opening 1a. At this time, the left detection pin 12 is not moved but only the right detection pin 11 is pushed in the direction f so that the detection pin 11 is moved. However, the detection pin 11 is moved in the direction f for a short distance and therefore the detection lever 23 is not moved in the direction k. As a result, only the first switch SW1 is switched off and the states of the second and third switches SW2 and SW3, which have been switched on, are maintained.

Figure 11:
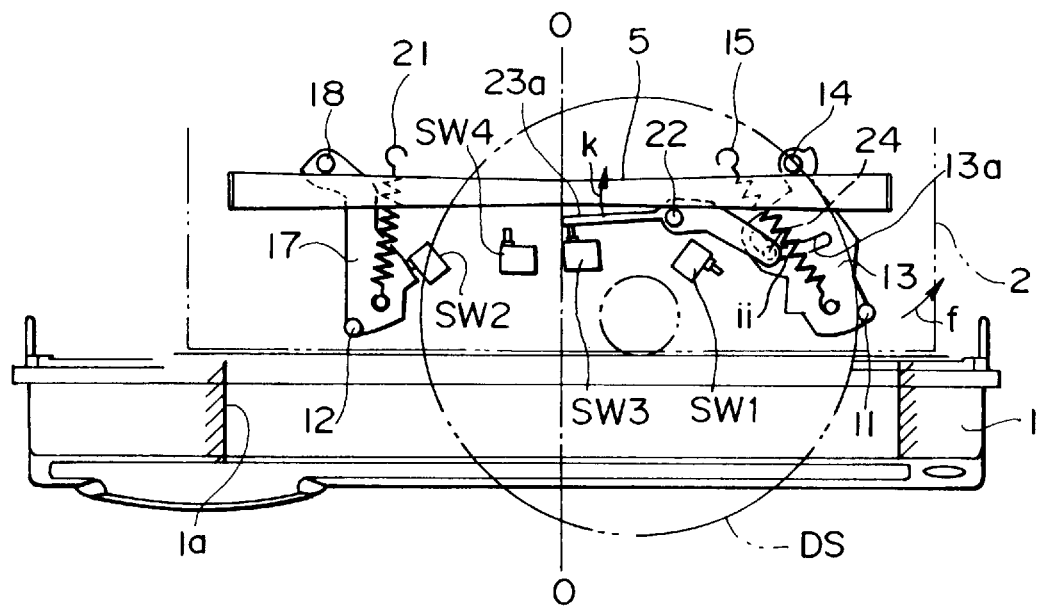
FIG. 11 is a partial plan view showing a state where the disc having the small diameter has been inserted from a position further deviated to the right as compared with the position shown in FIG. 10.

FIG. 11 shows a state where the small diameter disc DS has been inserted from a position further deviated to the right. At this time, the right detection pin 11 is moved for a long distance in the direction f and therefore the pin 24 has been moved to the second guide portion ii of the cam groove 13a. Thus, the detection lever 23 is rotated in the direction k and the third switch SW3 is switched off. Although the first switch SW1 has been switched off, the state of the second switch SW2, which has been switched on, is maintained.

Figure 12:
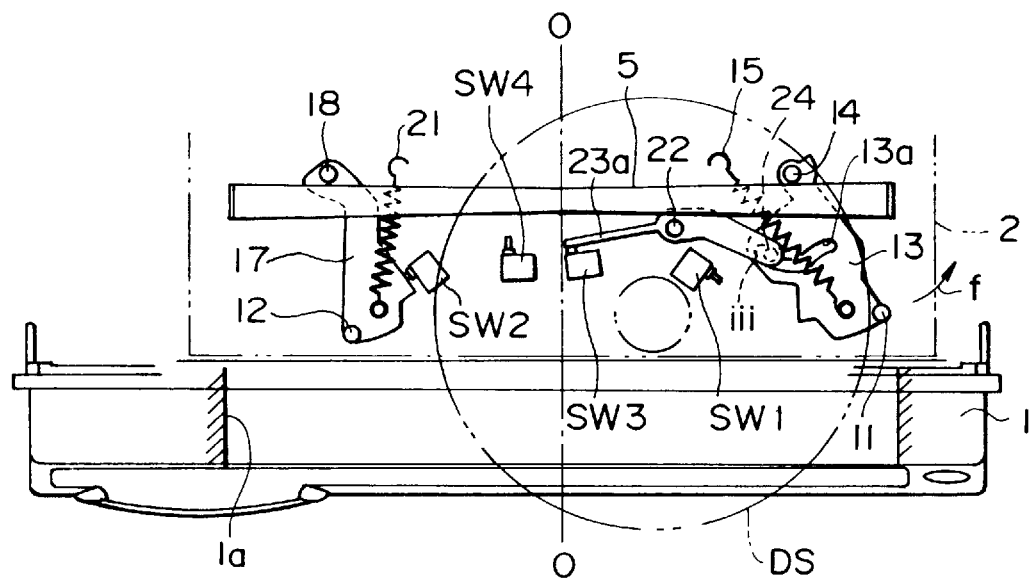
FIG. 12 is a partial plan view showing a state where the disc having the small diameter has been inserted from a rightmost position.

FIG. 12 shows a state where the small diameter disc DS has been inserted from the rightmost position of the disc insertion opening 1a. At this time, the pin 24 has been located in the third guide portion iii of the cam groove 13a and therefore the third switch SW3 has been switched on. As a result, only the first switch SW1 is switched off and the second switch SW2 is switched on.

Figure 13:
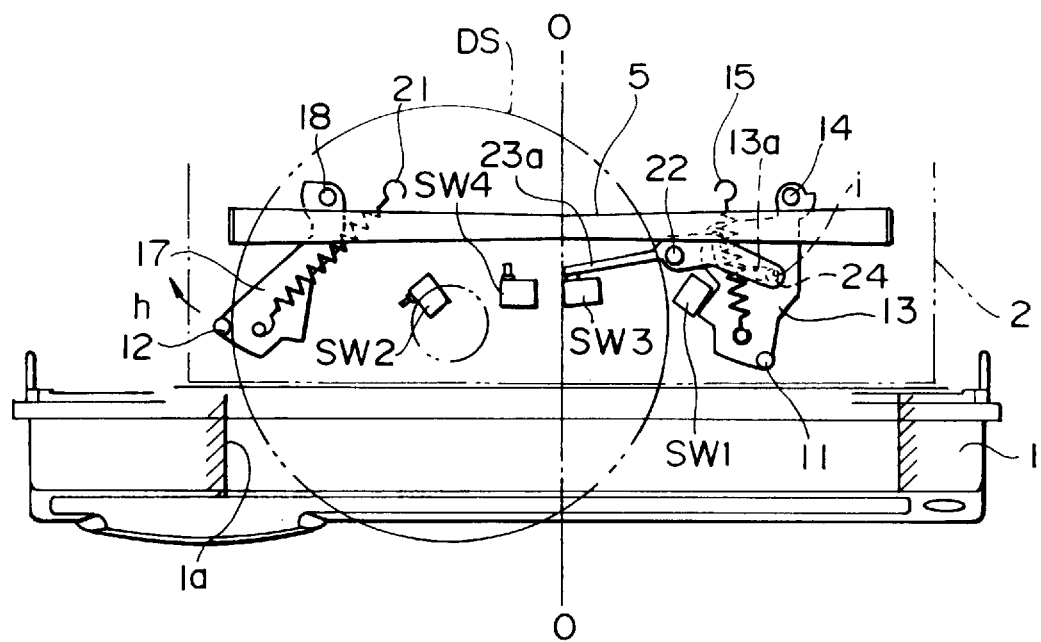
FIG. 13 is a partial plan view showing a state where the disc having the small diameter has been inserted from a position deviated to the left.

FIG. 13 shows a state where the small diameter disc DS has been inserted from a position deviated to the left of the disc insertion opening 1a. At this time, only the left detection pin 12 is pushed in the direction h and only the second switch SW2 is switched off. However, the states of the first and third switches SW1 and SW3, which have been switched on, are maintained.

As shown in FIGS. 9 to 13, if a disc DS having a diameter of 8 cm or a disc having a smaller diameter has been inserted through the disc insertion opening 1a, all of the switches SW1, SW2 and SW3 are not switched off. Thus, only when all of the switches SW1, SW2 and SW3 have been simultaneously switched off, a discrimination is performed that a disc DL having a predetermined diameter has been inserted. In the other cases, a discrimination is performed that a disc other than the disc DL has been inserted.

In this embodiment, only when all of the switches SW1, SW2 and SW3 have been simultaneously switched off as shown in FIG. 5, the motor M is allowed to start rotating to move the conveyance means 3 in the introduction direction. If a small diameter disc DS has been inserted as shown in FIGS. 9 to 13, the roller 5 of the conveyance means 3 is not moved in the introduction direction. If a discrimination is not, within a predetermined time, performed that the inserted disc is not the disc DL having the large diameter, the motor M is immediately rotated reversely so that the roller 5 is rotated in the direction b which is the ejection direction. Thus, when the small diameter disc DS has been pushed to the position above the roller 5 as shown in FIGS. 9 to 13, the rotation of the roller 5 in the direction b immediately causes the small diameter disc DS to be ejected toward the disc insertion opening 1a.

That is, when either of the switch SW1 or the switch SW2 is switched off, the timer 34 starts measuring time. In the case where the residual switch SW1 or the switch SW2 is not switched off within a predetermined time (in the case shown in FIGS. 10, 11, 12 and 13), the roller 5 is immediately rotated to the ejection direction. If only the first switch SW1 or the second switch SW2 has been switched off and the residual switch SW1 or SW2 has been switched off within a predetermined time from the start of the timer 34 (in the case shown in FIG. 9), the timer 34 starts measuring the time at a moment at which the two switches SW1 and SW2 have been switched off. If the third switch SW3 has not been switched off within a predetermined time, the conveyance of the roller 5 is allowed to start.

The control operation to be performed by the control portion 32 in accordance with the program will now be described in detail with reference to a flow chart shown in FIGS. 14 to 16.

Hereinafter steps 1, 2, . . . , in the flow chart are expressed by ST1, ST2, . . . , to simplify the description.

Figure 14:
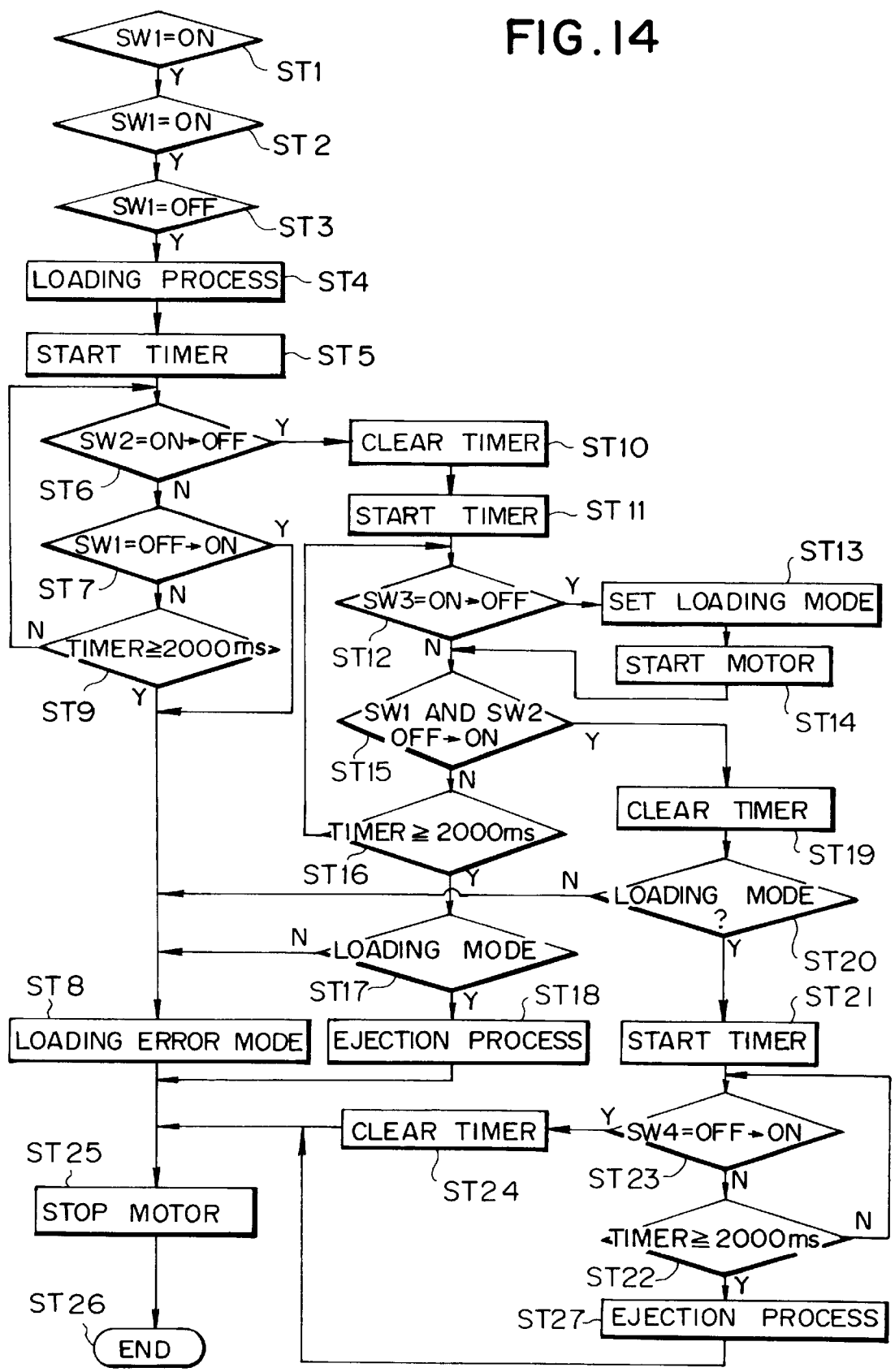
FIG. 14 is a flow chart of operations for discriminating the diameter of an inserted disc and loading the disc.

FIG. 14 shows the control operation to be performed when a disc has been newly inserted. Note that FIG. 14 shows a state where when the disc DL or the like has been inserted and the detection pin 11 is initially moved so that first switch SW1 of the switches SW1 and SW2 is initially switched off. However, there is a possibility that the detection pin 12 is initially moved and thus the second switch SW2 is initially switched off. The control operation of the foregoing case is the same as that shown in FIG. 14 such that the switches SW1 and SW2 are reversed between ST6 and ST7.

When the first switch SW1 has been initially switched off (the detection pin 11 has been moved in the direction f) in ST3 in a state where the states of both of the first and second switches SW1 and SW2, which have been switched on, are maintained in ST1 and ST2 (in the initial state shown in FIGS. 1 and 3), a mode for controlling a loading process (ST4) is sent to the control portion 32. In the control mode, the timer 34 starts measuring time immediately after the first switch SW1 has been switched off (ST5).

In ST6 whether or not the residual detection pin 12 is moved in the direction h and the second switch SW2 is switched off is determined. If the second switch SW2 is not switched off, whether or not the first switch SW1 is restored to the state where it is switched on (ST7) is monitored. If the first switch SW1 has been restored to the state where it is switched on, a loading error mode is immediately set (ST8).

If the second switch SW2 is not switched off in ST6 and the first switch SW1 is not restored to the state where it is switched on in ST7, the loading error mode is set after a lapse (ST9) of a predetermined time (2000 ms; 2 seconds) from the start of the timer 34 in ST5.

The loading error mode is set in the case where the inserted disc is not the disc DL having the diameter of 12 cm. When the loading error mode has been set, the motor M is temporarily stopped (ST25), and the motor M is rotated reversely so that a small diameter disc DS or the like is immediately ejected. The loading error mode will be described later with reference to a flow chart shown in FIG. 15.

If the second switch SW2 being switched off within 2 seconds in ST6 shown in FIG. 14 has been confirmed, the time measured by the timer 34 is cleared in ST10. At this time, the timer 34 restarts measuring time (ST11). If the third switch SW3 has been switched off (ST12) within the predetermined time (2000 ms; 2 seconds) elapsed from restart of the time measured in ST16, a discrimination is performed that the disc DL having the predetermined diameter has been inserted. Thus, the loading mode is set to the control portion 32 (ST13). Simultaneously with setting of the loading mode, the motor M starts rotating (ST14) so that the roller 5 is moved in the introduction direction (the direction a). Thus, the introduction of the disc DL into the body of the disc player starts.

If the third switch SW3 is not switched off in ST12; the states of the switches SW1 and SW2, which have been switched off, are maintained; and the predetermined time (2000 ms; 2 seconds) have been lapsed in ST16 after restart of the timer, the operation shifts to ST8 so that the loading error mode is set. That is, if confirmation is, in ST12, performed that the third switch SW3 has not been switched off two seconds after both of the switches SW1 and SW2 have been switched off, a discrimination is performed that a disc other than the disc DL having the predetermined diameter has been inserted. Thus, the loading error mode (ST8) is set so that the roller 5 is immediately rotated reversely.

When the discrimination is performed that the predetermined disc DL has been inserted; the loading mode has been set in ST13; the motor M is started in ST14; and the disc DL has been introduced into the body of the disc player, whether or not the first and second switches SW1 and SW2 are restored to the state where they are switched on is monitored in ST15. The foregoing monitoring operation is performed such that whether or not the detection pins 11 and 12 are restored to the initial positions as shown in FIG. 8 when the disc DL has been introduced. If the switches SW1 and SW2 are not restored to the state where they are switched on at a moment (ST16) after a lapse of a predetermined time (2000 ms; 2 seconds) from the moment at which the timer 34 has started measuring time, the operation proceeds to ST17 and ST18 in which the ejection process is performed. That is, when the detection pins 11 and 12 are not restored to the initial positions within 2 seconds from ST11 in a state where the discrimination has been performed that the inserted disc is the disc having the predetermined diameter and the disc has been introduced into the body of the disc player, a discrimination is performed that loading of the disc DL has not been performed normally. Thus, the disc DL is ejected due to the ejection process to be performed in ST18. Note that the ejection process will be described later with reference to FIG. 16.

If a confirmation is, in ST15, performed that the switches SW1 and SW2 have been restored to the state where they are switched on, the time measured by the timer 34 is cleared in ST19. Since the loading mode has been set (ST20) at this time, the disc DL having the predetermined diameter has been completely introduced. At this time, the timer 34 restarts measuring the time (ST21). If the fourth switch SW4 being switched on is detected in ST23 before a lapse of two seconds from the timer 34 has been started in ST22, clamping of the disc DL has been completed. At this time, the time measuring operation of the timer 34 is cleared in ST24, the motor M is stopped (ST25) and the process is completed (ST26).

If the fourth switch SW4 is not switched on after a lapse of two seconds measured by the timer 34 in ST22, a discrimination is performed that the introduced disc DL has not been normally clamped on the turn table of the disc drive mechanism. In the foregoing case, the operation shifts to the ejection process in ST27 so that the operation for ejecting the disc DL is performed.

The operation, to be performed when the loading error mode has been set, will now be described with reference to FIG. 15.

The loading error mode is set in a case where the first switch SW1 has been switched off in the process shown in FIG. 14 and the second switch SW2 has not been switched off within 2 seconds from the start of the timer 34 in ST5 or in a case where both of the switches SW1 and SW2 have been switched off and the third switch SW3 has not been switched off within two seconds from the start of the timer 34 in ST11. The foregoing case is a case where, for example, the small diameter disc DS has been inserted, that is, a disc except the disc DL having the predetermined diameter has been inserted as shown in FIGS. 9 to 13.

Figure 15:
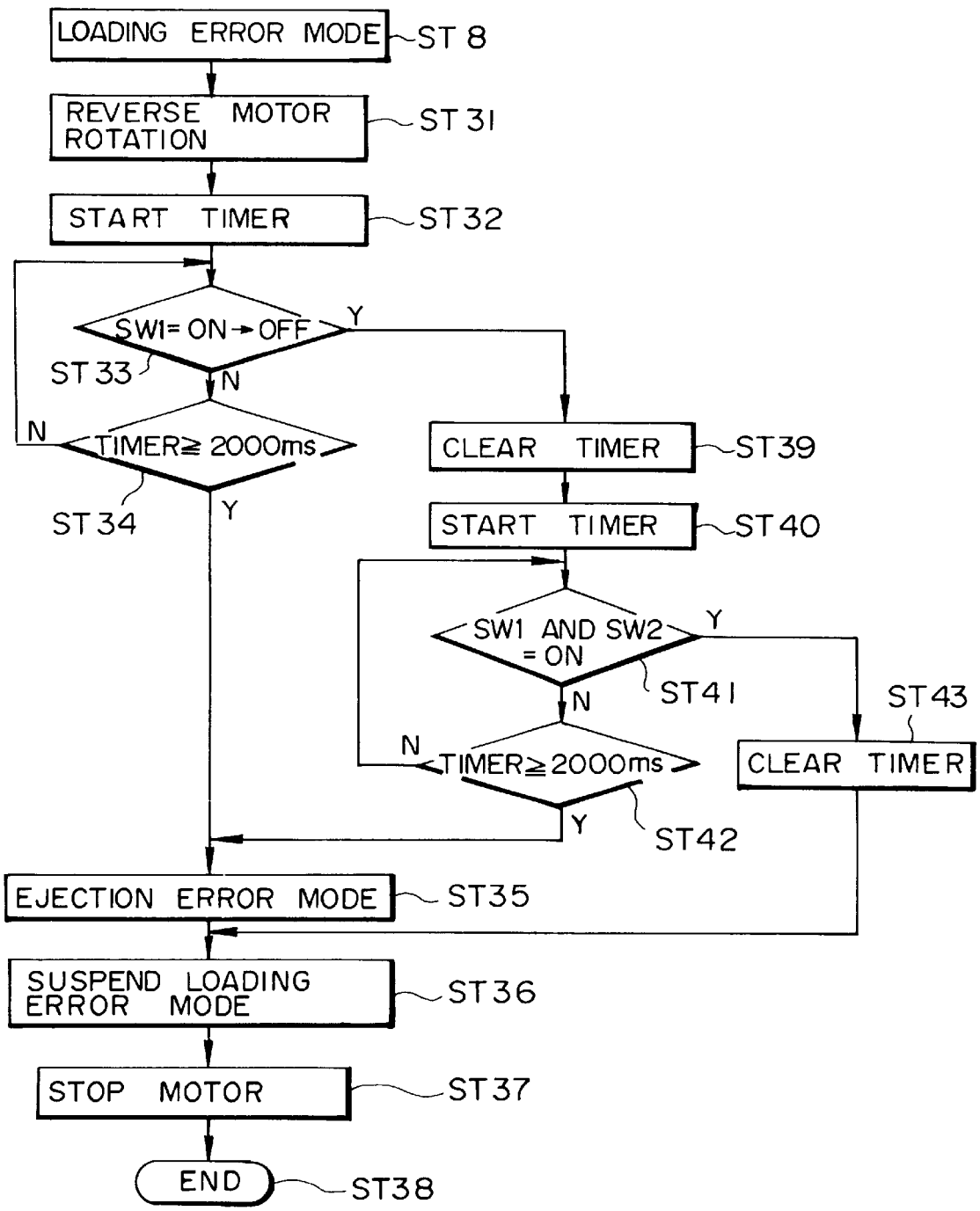
FIG. 15 is a flow chart of a process to be performed in a loading error mode in a case where a disc having a small diameter has been inserted.

Referring to FIG. 15, the first switch SW1 is monitored in ST33. The foregoing case is based on the assumption in ST3 shown in FIG. 14 that the first switch SW1 has been initially switched off when the disc has been inserted. Therefore, in the case where the switch, which is initially switched off in ST3 shown in FIG. 14 when the disc is inserted, is the second switch SW2, the second switch SW2 is monitored in ST33 in the loading error mode shown in FIG. 15.

When the loading error mode has been set, the roller 5 is not moved in the introduction direction (the direction a) but the motor M is immediately rotated reversely in ST31 shown in FIG. 15 so that the roller 5 is moved in the ejection direction (the direction b). As a result, the small diameter disc DS or the like is immediately ejected through the disc insertion opening 1a.

Simultaneously with start of the reverse rotation of the motor M, the timer 34 starts measuring the time in ST32. In ST34, whether or not a predetermined time (2000 ms; 2 seconds) has elapsed from the start of the timer 34 is monitored. In ST33 whether or not the first switch SW1, which has been switched on, is switched off within the foregoing time is monitored. That is, when the first switch SW1 is returned to the state where it is switched on in ST7 shown in FIG. 14, the loading error mode is set. In the foregoing case, the ejection error mode is set (ST35) if the first switch SW1 is not switched off within a predetermined time in ST33. If the ejection error mode is set, the loading error mode is suspended in ST36 so that the motor M is stopped (ST37) and the process is completed (ST38). If the ejection error mode is set as shown in FIG. 16, the operation cannot be restored as long as the ejection button is not operated.

If the first switch SW1 has been switched off in ST33, the operation of the timer 34 is cleared in ST39. In ST40 the timer 34 restarts. In ST42 whether or not both of the switches SW1 and SW2 are switched on within a predetermined time (2000 ms; two seconds) from the restart of the timer 34 is monitored (ST41). If both of the switches SW1 and SW2 are not switched on within the predetermined time in ST41, a discrimination is performed that a small diameter disc DS or the like has not been ejected normally through the disc insertion opening 1a. Thus, the ejection error mode is set in ST35.

If both of the switches SW1 and SW2 are switched on within the predetermined time in ST41, the ejection of the small diameter disc DS or the like has been completed. In ST43 the operation of the timer 34 is cleared and the loading error mode is suspended (ST36), the motor M is stopped (ST37), and the process is completed (ST38).

Figure 16:
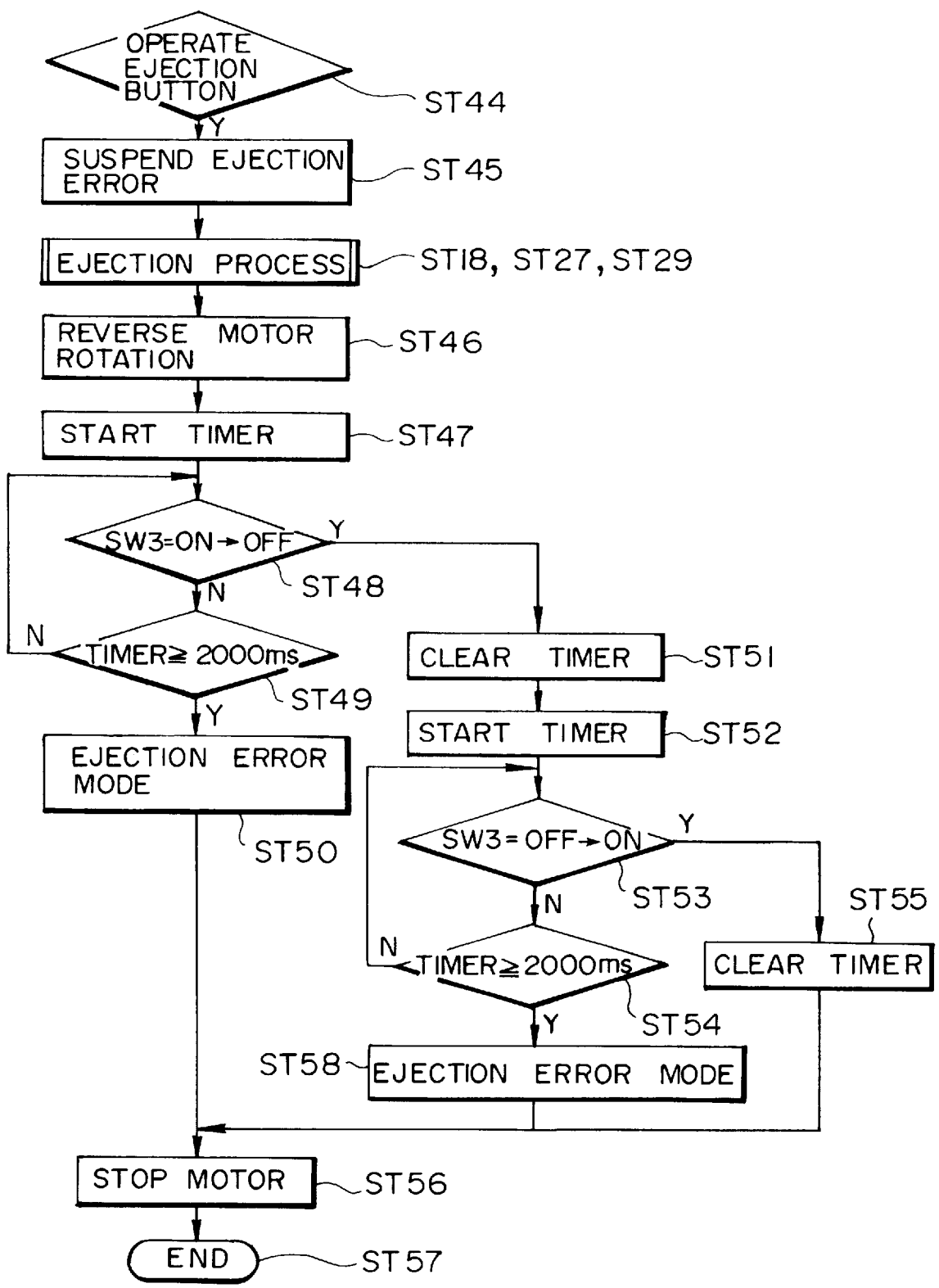
FIG. 16 is a flow chart of an ejection process.

FIG. 16 shows an operation for controlling the ejection process.

The ejection process shown in FIG. 16 is set in a case where the loading mode has been set (ST13), the motor M has been rotated (ST14) and the switches SW1 and SW2 have not been switched on within the predetermined time as shown in FIG. 14. That is, the ejection process is set when the disc DL is not normally introduced and the detection pins 11 and 12 are not restored to the initial position though a discrimination has been performed that the disc DL having the predetermined diameter has been inserted. The ejection process is also set in a case where the detection pins 11 and 12 have been restored to the original positions in ST15 and a discrimination has been performed that the disc having the predetermined diameter has been introduced into the body of the disc player; the fourth switch SW4 has not been switched on within the predetermined time in ST22; and a discrimination has been performed that clamping of the disc DL has not been performed reliably (ST27).

The ejection process is also set when the ejection button provided on the front surface of the nose portion 1 is depressed in ST44 shown in FIG. 16. The foregoing case is a case where a user intends ejection of the disc when the disc having the predetermined diameter has been clamped by the disc drive mechanism and reproduction or recording is being performed. In this case, the ejection error mode is initially suspended (ST45) and the operation is shifted to the ejection process. That is, in the case where the ejection error mode has been set in ST35 shown in FIG. 15, the ejection button is operated so that the ejection error mode is suspended and the operation is shifted to the ejection process.

In the ejection process, the motor M is rotated reversely in ST46 so that the roller 5 is moved in the ejection direction (the direction b). Thus, the disc DL is ejected. At this time, the timer 34 starts in ST47. In ST48 whether or not the third switch SW3, which has been switched on, is switched off is monitored. When the introduced disc DL is ejected, the detection pins 11 and 12 are moved away from each other. Thus, the pin 24 of the detection lever 23 is shifted from the first guide portion i to the second guide portion ii of the groove cam 13a. Therefore, the third switch SW3, which has been switched on, is expected to be switched off. In ST49 whether or not a predetermined time (2000 ms; 2 seconds) is elapsed is monitored. If the third switch SW3 has not been switched off within the foregoing time, the ejection error mode is set in ST50.

If a discrimination is performed in ST48 that the third switch SW3 has been switched off within two seconds, which is the predetermined time, the operation of the timer 34 is cleared in ST51. In ST52 the timer 34 is restarted. In ST54 whether or not the third switch SW3, which has been switched off, is switched on after a predetermined time (2000 ms; 2 seconds) has elapsed is monitored (ST53). If the disc DL has been normally ejected, the pin 24 located in the second guide portion ii is shifted to the third guide portion iii of the cam groove 13a during a period taken from the state shown in FIG. 8 to the state shown in FIG. 7 so that the third switch SW3, which has been switched off, is switched on. When the third switch SW3 has been switched on, the timer 34 is cleared in ST55. That is, a discrimination is performed that the disc DL has reached the normal ejection position (about the position shown in FIG. 7). Then, the motor M is stopped in ST56 and the process is stopped (ST57).

If the third switch SW3, which has been switched off, is not switched on after a lapse of two seconds in ST53, a discrimination is performed that the disc DL has not been normally ejected to about the position shown in FIG. 7. Thus, the ejection error mode starts (ST58). In the ejection error mode in ST50 and ST58, the motor M is stopped (ST56) and the process is stopped (ST57).

When the ejection error mode (ST35) shown in FIG. 15 or the ejection error mode (ST50 and ST58) shown in FIG. 16 has been set, occurrence of an error is displayed on, for example, the display portion and the operation is stopped until the ejection button is depressed.

Figure 17:
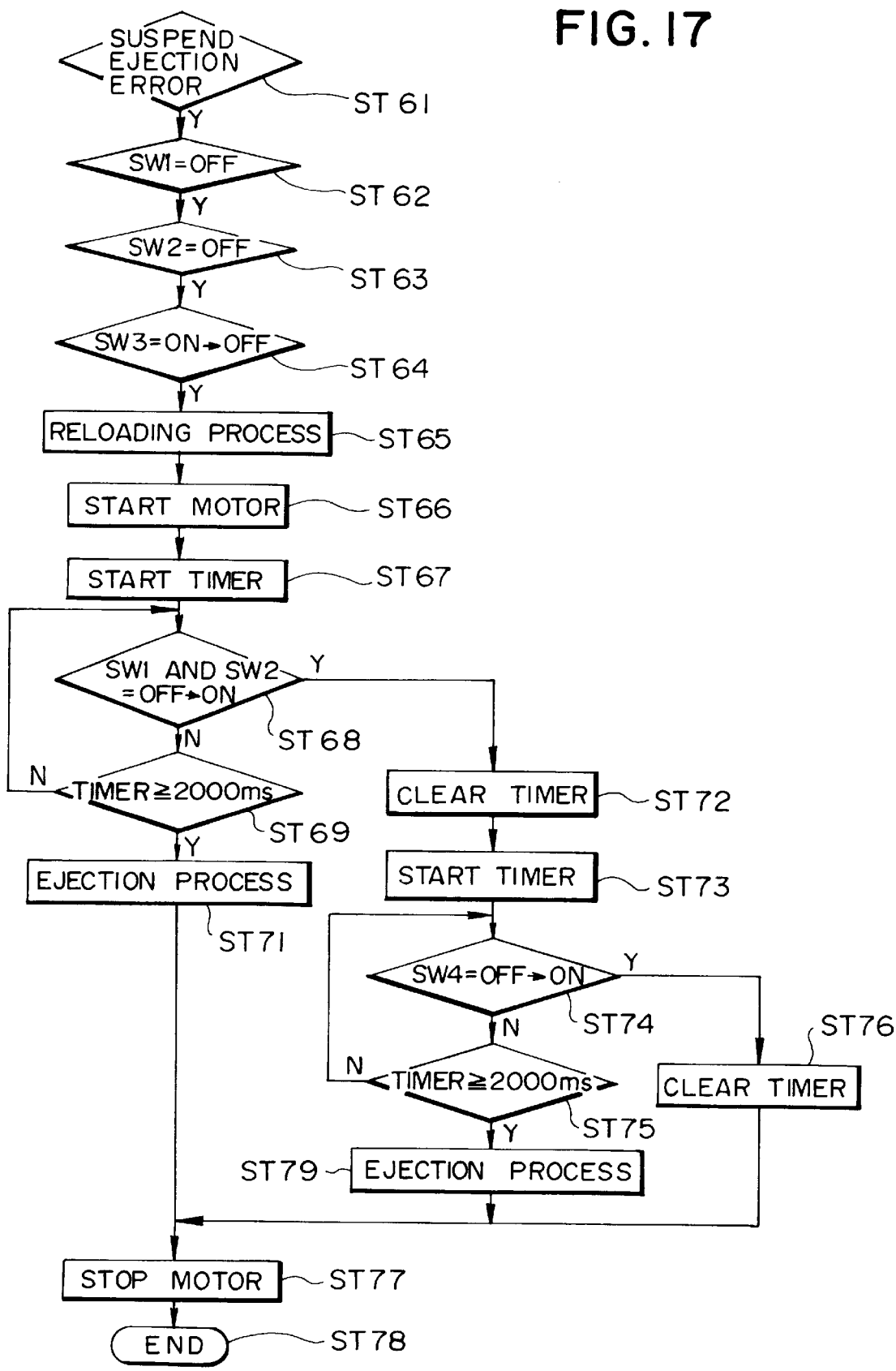
FIG. 17 is a flow chart of a control operation to be performed when a disc having a predetermined diameter is reinserted.

FIG. 17 shows a reloading process (the process to be performed when the disc DL has been again inserted) to be performed when the disc DL has been again pushed inwards after the ejecting operation (the ejection process) has been completed such that the disc DL having the predetermined diameter has been normally ejected and stopped at substantially the position shown in FIG. 7.

The reloading process is performed when the disc DL having the predetermined diameter is stopped at about the position shown in FIG. 7 as described above. That is, the reloading process can be set only when a confirmation has been performed that the ejection error mode has not been set in ST61 shown in FIG. 17; and a discrimination has been performed in ST62 that the first switch SW1 has been switched off and the second switch SW2 has been switched off.

When the disc DL is pushed at this time, the detection pin 11 is moved in the direction e and the detection lever 23 is rotated in the direction k so that the third switch SW3, which has been switched on, is switched off (ST64). At this time, the operation shifts to the reloading process in ST65.

In the reloading process (ST65) the motor M starts rotating in ST66 so that the roller 5 is rotated in the direction a. Thus, the disc DL is again introduced into the body of the disc player. At this time, the timer 34 starts in ST67. Whether or not both of the switches SW1 and SW2, which have been switched off, are switched on within (ST69) a predetermined time (2000 ms; 2 seconds) has elapsed from start of the timer 34 in ST67 is monitored in ST68. If both of the switches SW1 and SW2 are not switched on within the foregoing time, a discrimination is performed that the re-introduced disc DL has not been introduced normally. Thus, the ejection process is performed in ST71. The ejection process is performed as shown in FIG. 16.

If a discrimination has been performed in ST68 that both of the switches SW1 and SW2 have been switched on, the re-introduction of the disc DL has been performed normally. At this time, the timer 34 is cleared in ST72, and the timer 34 is restarted in ST73. If a discrimination has been performed that the fourth switch SW4 has been switched on in ST74 within the predetermined time (two seconds) set in ST75, the disc DL has been normally clamped by the disc drive mechanism. Thus, the timer 34 is cleared in ST76, and the motor M is stopped in ST77. Thus, the process is completed (ST78).

If the fourth switch SW4 has not been switched on within the predetermined time in ST74, the disc DL has not been normally clamped. Thus, the operation shifts to the ejection process in ST79.

As described above, according to the present invention, if a disc having a diameter other than a predetermined diameter has been inserted through the disc insertion opening, the disc is not introduced into the body of the disc player by the conveyance means but the ejecting operation is immediately performed. Therefore, a disc having a diameter other than a predetermined diameter can be ejected rapidly. Moreover, a disc having, for example, a small diameter, is not temporarily introduced and thus a problem that the disc is caught in the body of the disc player can be prevented.

When insertion of a disc has been detected, the timer is immediately started. If a discrimination that the inserted disc is the disc having a predetermined diameter has not been performed within a predetermined time, the operation is shifted to the ejection process. Thus, a disc having a diameter other than the predetermined diameter can be ejected rapidly.

By using a pair of the detection pins and the detection devices, the detection structure can be simplified. By providing a pair of the pins and the first to third detection devices, the detection pins and the detection devices enable all of the detection operations, such as the detection of the insertion, identification of the diameter of the inserted disc, detection of completion of the ejection of the disc and re-insertion of the disc after the disc has been ejected, to be performed. The detection means disposed near the disc insertion opening enables a variety of detection operations to be performed. Since the detection device is disposed in the body of the disc player, configuration of other elements can be determined freely.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A disc player having a disc insertion opening, through which a disc is manually inserted, and conveyance means rotatable in an insertion direction to pull the disc inserted through said disc insertion opening into a body of said disc player, and is rotatable in an ejection direction to eject the disc from the body of said disc player through said disc insertion opening, said disc player comprising:

detection means for discriminating a diameter of a manually inserted disc; and a control portion which operates said conveyance means in the insertion direction to pull the manually inserted disc into the body of said disc player only when said detection means determines that the manually inserted disc is equal to a predetermined diameter, and which operates said conveyance means in the ejection direction to eject the manually inserted disc from the body when the detection means determines that the manually inserted disc has a diameter other than the predetermined diameter;

a timer which is started when said detection means detects manual insertion of the disc, wherein if detection is not performed within a predetermined time from start of said timer that the diameter of the disk is equal to the predetermined diameter, then said control portion operates said conveyance means in the ejection direction;

wherein said timer is started when said conveyance means starts operating in the ejection direction;

wherein if a detection is performed by said detection means that ejection of the manually inserted disc is completed within the predetermined time from the start of said timer, then said conveyance means is stopped;

wherein if completion of the ejection within the predetermined time from the start of said timer is not detected, then also said conveyance means is stopped;

wherein said detection means includes a pair of detection pins pivotally mounted in the body adjacent the disc insertion opening such that the detection pins are moved away from each other by the outer surface of the manually inserted disc, and detection devices arranged to respectively detect movements of said detection pins, wherein if movements of said pair of detection pins away from each other for a distance longer than a predetermined distance are detected by said detection devices, then the detection devices output signals indicating that the manually inserted disc has the predetermined diameter, and wherein if movements of said detection pins away from each other for a distance longer than the predetermined distance are not detected by said detection devices, then the detection devices output signals indicating that the manually inserted disc has a diameter other than the predetermined diameter.

2. A disc player having a disc insertion opening, through which a disc is manually inserted, and conveyance means rotatable in an insertion direction to pull the disc inserted through said disc insertion opening into a body of said disc player, and is rotatable in an ejection direction to eject the disc from the body of said disc player through said disc insertion opening, said disc player comprising:

detection means for discriminating a diameter of a manually inserted disc; and a control portion which operates said conveyance means in the insertion direction to pull the manually inserted disc into the body of said disc player only when said detection means determines that the manually inserted disc is equal to a predetermined diameter, and which operates said conveyance means in the ejection direction to eject the manually inserted disc from the body when the detection means determines that the manually inserted disc has a diameter other than the predetermined diameter;

a timer which is started when said detection means detects manual insertion of the disc, wherein if detection is not performed within a predetermined time from start of said timer that the diameter of the disk is equal to the predetermined diameter, then said control portion operates said conveyance means in the ejection direction;

wherein said timer is started when said conveyance means starts operating in the ejection direction;

wherein if a detection is performed by said detection means that ejection of the manually inserted disc is completed within the predetermined time from the start of said timer, then said conveyance means is stopped;

wherein if completion of the ejection within the predetermined time from the start of said timer is not detected, then also said conveyance means is stopped;

wherein said detection means includes a pair of detection pins pivotally mounted in the body adjacent the disc insertion opening such that the detection pins are moved away from each other by the outer surface of the manually inserted disc, first and second detection devices arranged to respectively detect movements of said detection pins away from each other, and a third detection device for detecting whether either of said detection pins is moved a distance longer than a predetermined distance, wherein if the movements of said detection pins are detected by said first and second detection devices and the movement of either of said detection pins for the distance longer than the predetermined distance is detected by said third detection device, then the first, second and third detection devices output signals indicating that the manually inserted disc has the predetermined diameter, otherwise the first, second and third detection devices output signals indicating that the manually inserted disc has a diameter other than the predetermined diameter.

3. A disc player having a disc insertion opening, through which a disc is manually inserted, and conveyance means rotatable in an insertion direction to pull the disc inserted through said disc insertion opening into a body of said disc player, and is rotatable in an ejection direction to eject the disc from the body of said disc player through said disc insertion opening, said disc player comprising:

detection means for discriminating a diameter of a manually inserted disc; and a control portion which operates said conveyance means in the insertion direction to pull the manually inserted disc into the body of said disc player only when said detection means determines that the manually inserted disc is equal to a predetermined diameter, and which operates said conveyance means in the ejection direction to eject the manually inserted disc from the body when the detection means determines that the manually inserted disc has a diameter other than the predetermined diameter;

a timer which is started when said detection means detects manual insertion of the disc, wherein if detection is not performed within a predetermined time from start of said timer that the diameter of the disk is equal to the predetermined diameter, then said control portion operates said conveyance means in the ejection direction;

wherein said timer is started when said conveyance means starts operating in the ejection direction;

wherein if a detection is performed by said detection means that ejection of the manually inserted disc is completed within the predetermined time from the start of said timer, then said conveyance means is stopped;

wherein if completion of the ejection within the predetermined time from the start of said timer is not detected, then also said conveyance means is stopped;

wherein said detection means includes a pair of detection pins pivotally mounted in the body adjacent the disc insertion opening such that the detection pins are moved away from each other by the outer surface of the manually inserted disc, and detection devices arranged to respectively detect movements of said detection pins, wherein if movements of said pair of detection pins away from each other for a distance longer than a predetermined distance are detected by said detection devices, then the detection devices output signals indicating that the manually inserted disc has the predetermined diameter, and wherein if movements of said detection pins away from each other for a distance longer than the predetermined distance are not detected by said detection devices, then the detection devices output signals indicating that the manually inserted disc has a diameter other than the predetermined diameter.

4. A disc player having a disc insertion opening, through which a disc is manually inserted, and conveyance means rotatable in an insertion direction to pull the disc inserted through said disc insertion opening into a body of said disc player, and is rotatable in an ejection direction to eject the disc from the body of said disc player through said disc insertion opening, said disc player comprising:

detection means for discriminating a diameter of a manually inserted disc; and a control portion which operates said conveyance means in the insertion direction to pull the manually inserted disc into the body of said disc player only when said detection means determines that the manually inserted disc is equal to a predetermined diameter, and which operates said conveyance means in the ejection direction to eject the manually inserted disc from the body when the detection means determines that the manually inserted disc has a diameter other than the predetermined diameter;

a timer which is started when said detection means detects manual insertion of the disc, wherein if detection is not performed within a predetermined time from start of said timer that the diameter of the disk is equal to the predetermined diameter, then said control portion operates said conveyance means in the ejection direction;

wherein said detection means includes a pair of detection pins pivotally mounted in the body adjacent the disc insertion opening such that the detection pins are moved away from each other by the outer surface of the manually inserted disc, first and second detection devices arranged to respectively detect movements of said detection pins away from each other, and a third detection device for detecting whether either of said detection pins is moved a distance longer than a predetermined distance, wherein if the movements of said detection pins are detected by said first and second detection devices and the movement of either of said detection pins for the distance longer than the predetermined distance is detected by said third detection device, then the first, second and third detection devices output signals indicating that the manually inserted disc has the predetermined diameter, otherwise the first, second and third detection devices output signals indicating that the manually inserted disc has a diameter other than the predetermined diameter.

5. A disc player according to claim 4, wherein if said first detection device detects movement of said detection pin, then said timer is started, wherein if the second detection device does not detect movement of said detection pin within the predetermined time from the start of said timer, then said control portion operates the conveyance means in the ejection direction, wherein if the second detection device detects movement of said detection pin within the predetermined time from the start of timer, then operation of said timer is temporarily stopped and then the timer is restarted, and wherein if said third detection device does not detect the movement of said detection pin for a distance longer than the predetermined distance within the predetermined time from the restart of said timer, then said control portion operates said conveyance means in the ejection direction.

6. A disc player having a disc insertion opening, through which a disc is manually inserted, and conveyance means rotatable in an insertion direction to pull the disc inserted through said disc insertion opening into a body of said disc player, and is rotatable in an ejection direction to eject the disc from the body of said disc player through said disc insertion opening, said disc player comprising:

detection means for discriminating a diameter of a manually inserted disc; and a control portion which operates said conveyance means in the insertion direction to pull the manually inserted disc into the body of said disc player only when said detection means determines that the manually inserted disc is equal to a predetermined diameter, and which operates said conveyance means in the ejection direction to eject the manually inserted disc from the body when the detection means determines that the manually inserted disc has a diameter other than the predetermined diameter;

a timer which is started when said detection means detects insertion of the disc;

wherein said timer is started when said conveyance means starts operating in the ejection direction, wherein if a detection is performed by said detection means that ejection of the manually inserted disc has been completed within a predetermined time from the start of said timer, then said conveyance means is stopped;

wherein if completion of the ejection within the predetermined time from the start of said timer is not detected, then also said conveyance means is stopped, and;

wherein if the completion of the ejection is not detected, then an ejection error is recognized by said control portion;

wherein said detection means includes a pair of detection pins pivotally mounted in the body adjacent the disc insertion opening such that the detection pins are moved away from each other by the outer surface of the manually inserted disc, and detection devices arranged to respectively detect movements of said detection pins, wherein if movements of said pair of detection pins away from each other for a distance longer than a predetermined distance are detected by said detection devices, then the detection devices output signals indicating that the manually inserted disc has the predetermined diameter, and wherein if movements of said detection pins away from each other for a distance longer than the predetermined distance are not detected by said detection devices, then the detection devices output signals indicating that the manually inserted disc has a diameter other than the predetermined diameter.

7. A disc player according to claim 6, wherein when movement of either of said detection pins is detected by said detection device, said timer is started, and wherein if movements of said detection pins away from each other for a distance longer than a predetermined distance are not detected within the predetermined time from the start of said timer, then said conveyance means is started in the ejection direction.

8. A disc player having a disc insertion opening, through which a disc is manually inserted, and conveyance means rotatable in an insertion direction to pull the disc inserted through said disc insertion opening into a body of said disc player, and is rotatable in an ejection direction to eject the disc from the body of said disc player through said disc insertion opening, said disc player comprising:

detection means for discriminating a diameter of a manually inserted disc; and a control portion which operates said conveyance means in the insertion direction to pull the manually inserted disc into the body of said disc player only when said detection means determines that the manually inserted disc is equal to a predetermined diameter, and which operates said conveyance means in the ejection direction to eject the manually inserted disc from the body when the detection means determines that the manually inserted disc has a diameter other than the predetermined diameter;

a timer which is started when said detection means detects insertion of the disc;

wherein said timer is started when said conveyance means starts operating in the ejection direction, wherein if a detection is performed by said detection means that ejection of the manually inserted disc has been completed within a predetermined time from the start of said timer, then said conveyance means is stopped;

wherein if completion of the ejection within the predetermined time from the start of said timer is not detected, then also said conveyance means is stopped, and;

wherein if the completion of the ejection is not detected, then an ejection error is recognized by said control portion;

wherein said detection means includes a pair of detection pins pivotally mounted in the body adjacent the disc insertion opening such that the detection pins are moved away from each other by the outer surface of the manually inserted disc, first and second detection devices arranged to respectively detect movements of said detection pins away from each other, and a third detection device for detecting whether either of said detection pins is moved a distance longer than a predetermined distance, wherein if the movements of said detection pins are detected by said first and second detection devices and the movement of either of said detection pins for the distance longer than the predetermined distance is detected by said third detection device, then the first, second and third detection devices output signals indicating that the manually inserted disc has the predetermined diameter, otherwise the first, second and third detection devices output signals indicating that the manually inserted disc has a diameter other than the predetermined diameter.

9. A disc player according to claim 8, wherein if said third detection device detects restoration of either of said detection pins to a predetermined position at a moment at which said first and second detection devices do not detect restorations of said detection pins when the manually inserted disc loaded into the body of said disc player and having the predetermined diameter is ejected by said conveyance means, then said conveyance means is stopped.

10. A disc player having a disc insertion opening, through which a disc is manually inserted, and conveyance means rotatable in an insertion direction to pull the disc inserted through said disc insertion opening into a body of said disc player, and is rotatable in an ejection direction to eject the disc from the body of said disc player through said disc insertion opening, said disc player comprising:

detection means for discriminating a diameter of a manually inserted disc; and a control portion which operates said conveyance means in the insertion direction to pull the manually inserted disc into the body of said disc player only when said detection means determines that the manually inserted disc is equal to a predetermined diameter;

wherein said detection means includes a pair of detection members pivotally mounted in the body adjacent the disc insertion opening such that the detection members are moved away from each other by the outer surface of the manually inserted disc, and detection devices arranged to respectively detect movements of said detection members, wherein if movements of said pair of detection members away from each other for a distance longer than a predetermined distance are detected by said detection devices, then the detection devices output signals indicating that the manually inserted disc has the predetermined diameter, and wherein if movements of said detection members away from each other for a distance longer than the predetermined distance are not detected by said detection devices, then the detection devices output signals indicating that the manually inserted disc has a diameter other than the predetermined diameter.

11. A disc player according to claim 10, further comprising a timer which is started when said detection means detects insertion of the disc;

wherein when movement of either of said detection members is detected by said detection device, said timer is started, and wherein if movements of said detection members away from each other for a distance longer than a predetermined distance are not detected within a predetermined time from the start of said timer, then said control portion operates said conveyance means in the ejection direction.

12. A disc player having a disc insertion opening, through which a disc is manually inserted, and conveyance means rotatable in an insertion direction to pull the disc inserted through said disc insertion opening into a body of said disc player, and is rotatable in an ejection direction to eject the disc from the body of said disc player through said disc insertion opening, said disc player comprising:

detection means for discriminating a diameter of a manually inserted disc; and a control portion which operates said conveyance means in the insertion direction to pull the manually inserted disc into the body of said disc player only when said detection means determines that the manually inserted disc is equal to a predetermined diameter;

wherein said detection means includes a pair of detection members pivotally mounted in the body adjacent the disc insertion opening such that the detection members are moved away from each other by the outer surface of the manually inserted disc, first and second detection devices arranged to respectively detect movements of said detection members away from each other, and a third detection device for detecting whether either of said detection members is moved a distance longer than a predetermined distance, and wherein if the movements of said detection members are detected by said first and second detection devices and the movement of either of said detection members for the distance longer than the predetermined distance is detected by said third detection device, then the first, second and third detection devices output signals indicating that the manually inserted disc has the predetermined diameter, otherwise the first, second and third detection devices output signals indicating that the manually inserted disc has a diameter other than the predetermined diameter.

13. A disc player according to claim 12, further comprising a timer which is started when said detection means detects insertion of the disc;

wherein if said first detection device detects movement of said detection member, then said timer is started, wherein if the second detection device does not detect movement of said detection member within a predetermined time from the start of said timer, then said control portion operates said conveyance means in the ejection direction, wherein if the second detection device detects movement of said detection member within the predetermined time from the start of said timer, then operation of said timer is temporarily stopped and then the timer is restarted, and wherein if said third detection device does not detect the movement of said detection member for a distance longer than the predetermined distance within the predetermined time from the restart of said timer, then said control portion operates said conveyance means in the ejection direction.

14. A disc player according to claim 13, wherein if said third detection device detects restoration of either of said detection members to a predetermined position at a moment at which said first and second detection devices do not detect restorations of said detection members when the manually inserted disc loaded into the body of said disc player and having the predetermined diameter is ejected by said conveyance means, then said conveyance means is stopped.

15. A disc player according to claim 12, wherein if said third detection device detects restoration of either of said detection members to a predetermined position at a moment at which said first and second detection devices do not detect restorations of said detection members when the manually inserted disc loaded into the body of said disc player and having the predetermined diameter is ejected by said conveyance means, then said conveyance means is stopped.

16. A disc player according to claim 15, wherein when the manually inserted disc is again manually pushed and movement of said detection member is detected by said third detection device, said control portion operates said conveyance means in the insertion direction so that the manually inserted disc is again pulled into the body of said disc player.

* * * * *